US012712131B2

(12) United States Patent
Son et al.

(10) Patent No.: US 12,712,131 B2
(45) Date of Patent: Aug. 18, 2026

(54) METHOD OF MANUFACTURING MULTILAYER ELECTRONIC COMPONENT

(71) Applicant: SAMSUNG ELECTRO-MECHANICS CO., LTD., Suwon-si (KR)

(72) Inventors: Myung Chan Son, Suwon-si (KR); Yong Park, Suwon-si (KR); Jong Ho Lee, Suwon-si (KR); Eun Jung Lee, Suwon-si (KR); Jung Tae Park, Suwon-si (KR); Min Woo Kim, Suwon-si (KR); Ji Hyeon Lee, Suwon-si (KR); Sun Mi Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 248 days.

(21) Appl. No.: 18/127,234

(22) Filed: Mar. 28, 2023

(65) Prior Publication Data

US 2024/0071689 A1 Feb. 29, 2024

(30) Foreign Application Priority Data

Aug. 29, 2022 (KR) ........................ 10-2022-0108415

(51) Int. Cl.
*H01G 4/30* (2006.01)
*C04B 35/64* (2006.01)
(Continued)

(52) U.S. Cl.
CPC ............... *H01G 4/30* (2013.01); *C04B 35/64* (2013.01); *H01G 2/065* (2013.01); *H01G 4/008* (2013.01); *H01G 4/012* (2013.01); *H01G 4/12* (2013.01)

(58) Field of Classification Search
CPC .......... H01G 4/30; H01G 2/065; H01G 4/012; H01G 4/12; H01G 4/232; H01G 4/005; H01G 13/00; C04B 35/64; Y10T 29/417
See application file for complete search history.

(56) References Cited

U.S. PATENT DOCUMENTS 8,795,454 B2 * 8/2014 Matsui .................... H01L 21/64
156/289
10,650,973 B2 * 5/2020 Takagi ..................... H01G 4/12
(Continued)

FOREIGN PATENT DOCUMENTS

JP 2017-157695 A 9/2017
JP 2017-183469 A 10/2017
(Continued)

OTHER PUBLICATIONS

Office Action issued on Jan. 19, 2026 in corresponding Korean Patent Application No. 10-2022-0108415 with English tranlsation.

*Primary Examiner* — Donghai D Nguyen
(74) *Attorney, Agent, or Firm* — Morgan, Lewis & Bockius LLP

(57) ABSTRACT

A method of manufacturing a multilayer electronic component includes forming a stack by stacking a plurality of ceramic green sheets on which conductive patterns are disposed on a support film, cutting the stack in a second direction, perpendicular to a first direction which is a stacking direction of the plurality of ceramic green sheets, cutting the stack in a third direction, perpendicular to the first and second directions, to obtain a plurality of unit chips, separating the unit chip from the support film, arranging the unit chip such that one of side surfaces of the unit chip is in contact with an adhesive tape, and attaching another one of the side surfaces to a ceramic green sheet for a side margin portion, and forming a side margin portion on the another one of side surfaces.

47 Claims, 20 Drawing Sheets

(51) Int. Cl.

| | |
|---|---|
| ***H01G 2/06*** | (2006.01) |
| ***H01G 4/008*** | (2006.01) |
| ***H01G 4/012*** | (2006.01) |
| ***H01G 4/12*** | (2006.01) |

(56) References Cited

U.S. PATENT DOCUMENTS

| | | | | |
|---|---|---|---|---|
| 10,937,595 | B2 * | 3/2021 | Park ......................... | H01G 4/12 |
| 2012/0234462 | A1 | 9/2012 | Matsui et al. | |
| 2017/0287643 | A1 * | 10/2017 | Kobayashi ............... | H01G 4/30 |
| 2021/0335541 | A1 | 10/2021 | Ikeda | |

FOREIGN PATENT DOCUMENTS

| | | | |
|---|---|---|---|
| JP | 2019-149504 | A | 9/2019 |
| KR | 10-2012-0072870 | A | 7/2012 |
| KR | 10-2021-0131241 | A | 11/2021 |

* cited by examiner 19
20
21
22
38
40
41
47
48
49

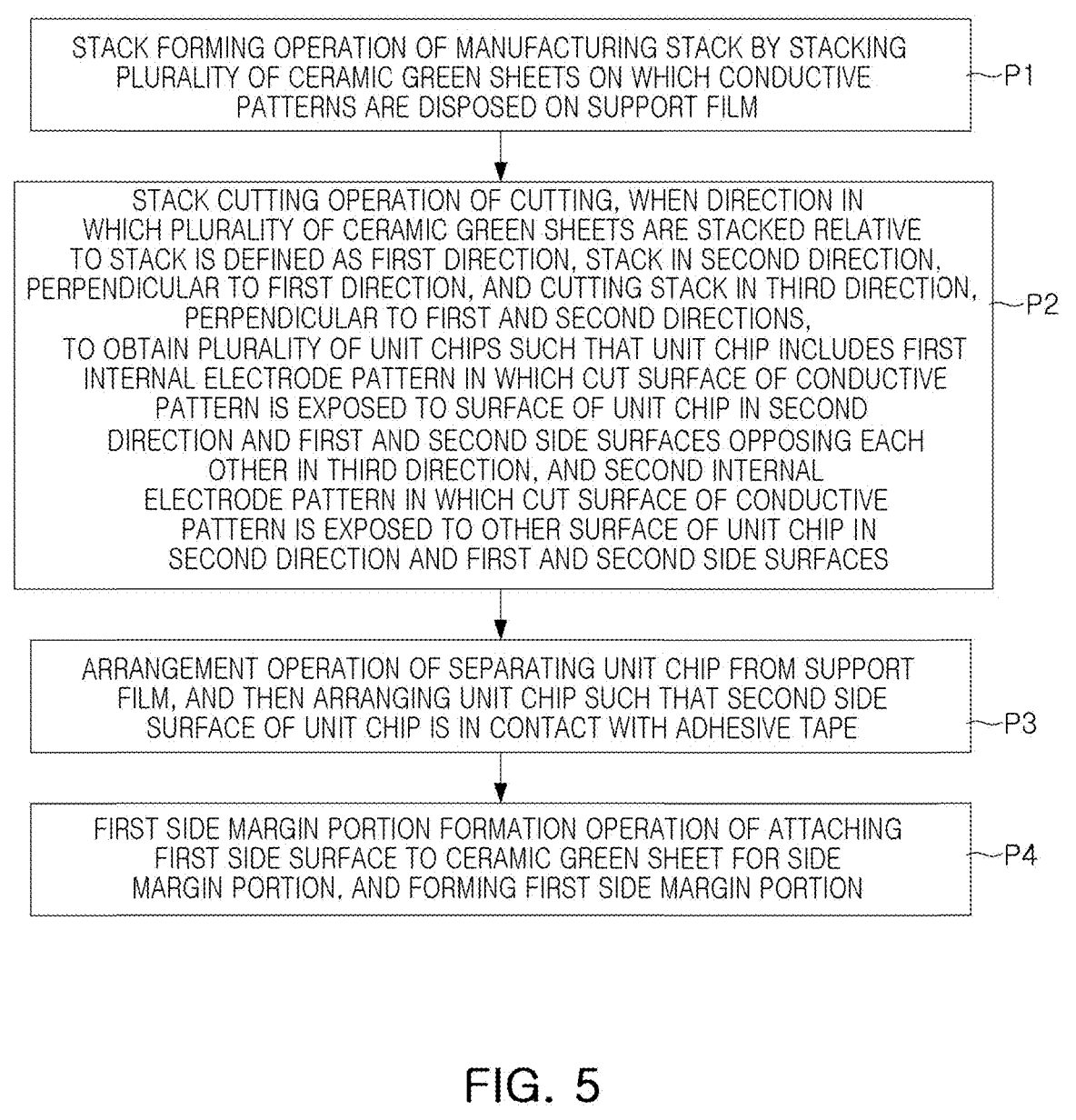

STACK FORMING OPERATION OF MANUFACTURING STACK BY STACKING PLURALITY OF CERAMIC GREEN SHEETS ON WHICH CONDUCTIVE PATTERNS ARE DISPOSED ON SUPPORT FILM ~P1

STACK CUTTING OPERATION OF CUTTING, WHEN DIRECTION IN WHICH PLURALITY OF CERAMIC GREEN SHEETS ARE STACKED RELATIVE TO STACK IS DEFINED AS FIRST DIRECTION, STACK IN SECOND DIRECTION, PERPENDICULAR TO FIRST DIRECTION, AND CUTTING STACK IN THIRD DIRECTION, PERPENDICULAR TO FIRST AND SECOND DIRECTIONS, TO OBTAIN PLURALITY OF UNIT CHIPS SUCH THAT UNIT CHIP INCLUDES FIRST INTERNAL ELECTRODE PATTERN IN WHICH CUT SURFACE OF CONDUCTIVE PATTERN IS EXPOSED TO SURFACE OF UNIT CHIP IN SECOND DIRECTION AND FIRST AND SECOND SIDE SURFACES OPPOSING EACH OTHER IN THIRD DIRECTION, AND SECOND INTERNAL ELECTRODE PATTERN IN WHICH CUT SURFACE OF CONDUCTIVE PATTERN IS EXPOSED TO OTHER SURFACE OF UNIT CHIP IN SECOND DIRECTION AND FIRST AND SECOND SIDE SURFACES ~P2

ARRANGEMENT OPERATION OF SEPARATING UNIT CHIP FROM SUPPORT FILM, AND THEN ARRANGING UNIT CHIP SUCH THAT SECOND SIDE SURFACE OF UNIT CHIP IS IN CONTACT WITH ADHESIVE TAPE ~P3

FIRST SIDE MARGIN PORTION FORMATION OPERATION OF ATTACHING FIRST SIDE SURFACE TO CERAMIC GREEN SHEET FOR SIDE MARGIN PORTION, AND FORMING FIRST SIDE MARGIN PORTION ~P4

FIG. 5

METHOD OF MANUFACTURING MULTILAYER ELECTRONIC COMPONENT

CROSS-REFERENCE TO RELATED APPLICATION(S)

This application claims benefit of priority to Korean Patent Application No. 10-2022-0108415 filed on Aug. 29, 2022 in the Korean Intellectual Property Office, the disclosure of which is incorporated herein by reference in its entirety.

TECHNICAL FIELD

The present disclosure relates to a method of manufacturing a multilayer electronic component.

BACKGROUND

A multilayer ceramic capacitor (MLCC), a type of multilayer electronic component, may be a chip-type capacitor mounted on the printed circuit boards of various electronic products such as imaging devices including liquid crystal displays (LCDs) and plasma display panels (PDPs), computers, smartphones, mobile phones, and the like, serving to charge or discharge electricity therein or therefrom.

In order to implement a small-sized, high-capacitance multilayer ceramic capacitor according to the related art, an internal electrode is exposed in a width direction of a body, thereby maximizing an area of the internal electrode in the width direction through a marginless design. In an operation before performing sintering after manufacturing such a unit chip, a process of separately attaching side margin portions to an exposed surface of the internal electrode in a width direction of the unit chip is applied.

In particular, Related Art 1 discloses a technique of simultaneously exposing side margin formation surfaces of a plurality of stacked chips in the same direction (upward direction) using an adhesive sheet and an elastic pad.

Specifically, according to a method of forming a side margin portion disclosed in Related Art 1, cut side surfaces of a plurality of green chips arranged in row and column directions are uniformly opened by a process of tumbling the plurality of green chips in a state in which the plurality of green chips are spaced apart from each other at regular intervals. Thereafter, an operation of attaching a side surface ceramic green sheet to the cut side surfaces of the plurality of green chips is included.

In particular, in the tumbling method disclosed in Related Art 1, strong shearing force caused by a support and a tumbling action plate is applied to the plurality of green chips. As a result, stress may be concentrated on an edge of the green chip acting as the center of rotation. Accordingly, edges of the plurality of green chips may be damaged, thereby degrading reliability and manufacturing yield of a multilayer electronic component.

In addition, according to the method of forming a side margin portion disclosed in Related Art 1, the plurality of green chips need to be simultaneously rotated, such that a plurality of adjacent stacked chips may stick to each other, and defects such as non-movement and non-rotation may occur due to size distribution of the plurality of green chips.

In the present disclosure, in the process of exposing a side margin formation surface of a unit chip to form a side margin portion of a multilayer electronic component, it is possible to suppress the concentration of stress on an edge of the unit chip, and to reduce defects such as non-movement and non-rotation that may occur while simultaneously exposing a plurality of unit chips, thereby improving reliability and manufacturing yield of the multilayer electronic component.

Related Art 1: US Patent Publication No. 2012-0234462

SUMMARY

An aspect of the present disclosure is to address an issue in which stress is concentrated at edges of a plurality of unit chips in the process of opening side margin portion attachment surfaces of the plurality of unit chips to form a side margin portion.

Another aspect of the present disclosure is to address an issue in which a unit chip does not move or rotate that may occur due to size distribution between a plurality of unit chips, when side margin portion attachment surfaces are opened by tumbling the plurality of unit chips to form a side margin portion.

Another aspect of the present disclosure is to address an issue in which adhesive force of a side margin portion is reduced due to rapid drying of a ceramic green sheet, when the side margin portion is formed by punching the ceramic green sheet on side margin portion attachment surfaces of a plurality of unit chips.

Another aspect of the present disclosure is to address an issue of having to secure adhesive force of a side margin portion by coating an adhesive ingredient on a surface of a ceramic green sheet due to rapid drying of the ceramic green sheet, when the side margin portion is formed by punching the ceramic green sheet on side margin attachment surfaces of a plurality of unit chips.

However, the aspects of the present disclosure are not limited to the above, and will be more easily understood in the process of describing specific example embodiments of the present disclosure.

According to an aspect of the present disclosure, there is provided a method of manufacturing a multilayer electronic component, the method including a stack forming operation of forming a stack by stacking, a plurality of ceramic green sheets on which conductive patterns are disposed, on a support film, a direction in which the plurality of ceramic green sheets are stacked relative to the stack being a first direction, a stack cutting operation of cutting the stack in a second direction, perpendicular to the first direction, and cutting the stack in a third direction, perpendicular to the first and second directions, to obtain a plurality of unit chips such that one of the plurality of unit chips includes a first internal electrode pattern in which a cut surface of the conductive pattern is exposed to one surface of the one unit chip in the second direction and first and second side surfaces opposing each other in the third direction, and a second internal electrode pattern in which the cut surface of the conductive pattern is exposed to the other surface of the one unit chip in the second direction and the first and second side surfaces, an arrangement operation of separating the one unit chip from the support film, and then arranging the one unit chip such that the second side surface of the one unit chip is in contact with adhesive tape, and a first side margin portion formation operation of attaching the first side surface to a ceramic green sheet for a side margin portion, and forming a first side margin portion.

According to another aspect of the present disclosure, there is provided a method of manufacturing a multilayer electronic component, the method including a stack forming operation of forming a stack by stacking a plurality of ceramic green sheets on which conductive patterns are disposed on a support film, a stack cutting operation of cutting, when a direction in which the plurality of ceramic green sheets are stacked relative to the stack is defined as a first direction, the stack in a second direction, perpendicular to the first direction, and cutting the stack in a third direction, perpendicular to the first and second directions, to obtain a plurality of unit chips such that one of the plurality of unit chips includes a first internal electrode pattern in which a cut surface of the conductive pattern is exposed to one surface of the one unit chip in the second direction and first and second side surfaces opposing each other in the third direction, and a second internal electrode pattern in which the cut surface of the conductive pattern is exposed to the other surface of the one unit chip in the second direction and the first and second side surfaces, an arrangement operation of separating the one unit chip from the support film without rotating the one unit chip, and arranging the one unit chip such that the second side surface of the one unit chip is in contact with adhesive tape, and a first side margin portion formation operation of attaching the first side surface to a ceramic green sheet for a side margin portion, and forming a first side margin portion.

According to another aspect of the present disclosure, there is provided a method of manufacturing a multilayer electronic component, the method including forming a stack, by stacking a plurality of ceramic green sheets on which conductive patterns are disposed, on a support film; cutting the stack on the support film to form an array of unit chips; transferring the array of unit chips from the support film to an adhesive tape such that a cut surface among a plurality of surfaces of each unit chip becomes a temporary mounting surface being mounted on and in contact with the adhesive tape; and attaching a ceramic green sheet for a side margin portion on a surface of each unit chip opposing the temporary mounting surface thereof to form a first side margin portion on each unit chip. The transferring is performed in a state in which the cut surface among the plurality of surfaces of a respective one of the unit chips which is disposed on the support film and which is to be transferred faces a plane of the adhesive tape.

to another aspect of the present disclosure, there is provided a multilayer electronic component, the multilayer electronic component including a body including a dielectric layer and first and second internal electrodes stacked in a first direction with the dielectric layer interposed therebetween, and including first and second surfaces opposing each other in the first direction, third and fourth surfaces connected to the first and second surfaces and opposing each other a second direction, first and second side surfaces connected to the first to fourth surfaces and opposing each other in a third direction; a first margin portion disposed on the first side surface; a second margin portion disposed on the second side surface; a first external electrode disposed on the third surface to connect to the first internal electrode; and a second external electrode disposed on the fourth surface to connect to the second internal electrode. The first side margin portion extends from the first side surface to a portion of at least one of the first to fourth surfaces.

According to example embodiments of the present disclosure, stress may not need to be concentrated on specific portions of a plurality of unit chips in the process of opening side margin portion attachment surfaces of the plurality of unit chips, thereby suppressing damage to the unit chips and improving reliability and manufacturing yield of a multilayer electronic component having side margin portions formed thereon.

According to example embodiments of the present disclosure, it is possible to suppress cracks occurring at a boundary between a capacitance formation portion and a cover portion of a multilayer electronic component by replacing a process of concentrating stress on a specific portion of a unit chip.

According to example embodiments of the present disclosure, it is possible to improve manufacturing yield of a multilayer electronic component by preventing non-movement and non-rotation of a unit chip, even when size distribution between a plurality of unit chips is present.

According to example embodiments of the present disclosure, it is possible to secure sufficient adhesive force of a side margin portion by suppressing rapid drying of a ceramic green sheet, when a side margin portion is formed by punching the ceramic green sheet on side margin attachment surfaces of a plurality of unit chips.

The various and beneficial advantages and effects of the present disclosure are not limited to the above, and will be more easily understood in the course of describing specific example embodiments.

BRIEF DESCRIPTION OF DRAWINGS

The above and other aspects, features, and advantages of the present disclosure will be more clearly understood from the following detailed description, taken in conjunction with the accompanying drawings, in which:

FIG. 5 is a schematic diagram illustrating a sequence of a method of manufacturing a multilayer electronic component according to an example embodiment of the present disclosure;

DETAILED DESCRIPTION

Figure 1:
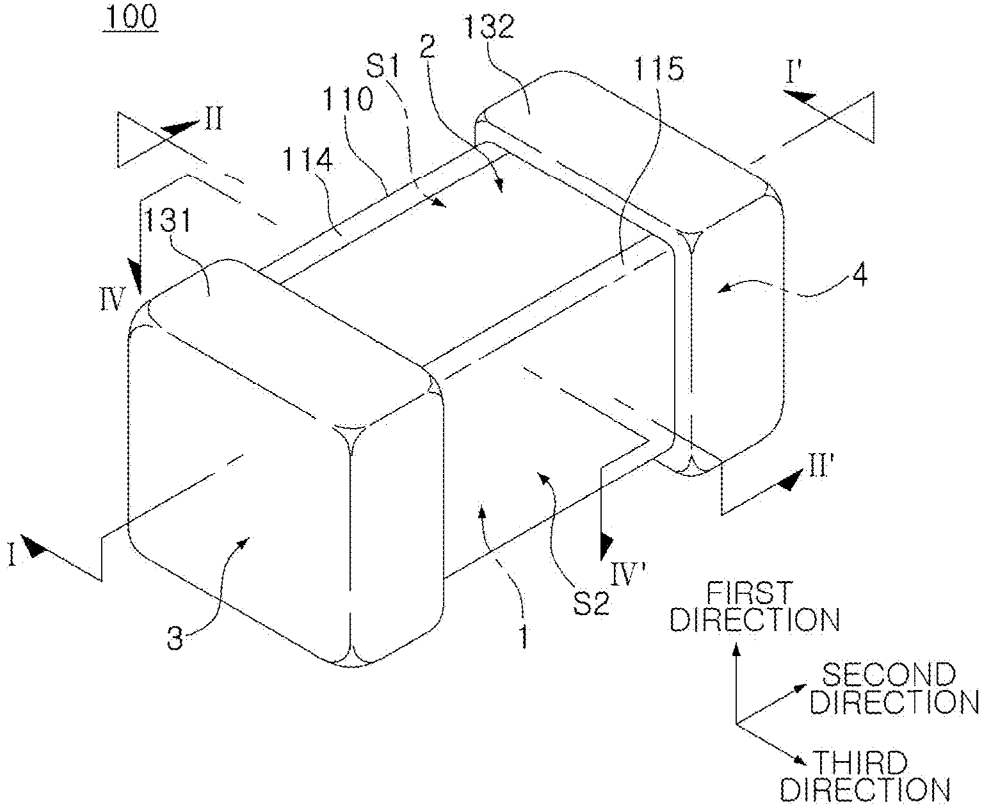
FIG. 1 illustrates a schematic perspective view of a multilayer electronic component manufacturable by a method of manufacturing a multilayer electronic component according to an example embodiment of the present disclosure.

Hereinafter, example embodiments of the present disclosure are described with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is represented by as "comprising" or "including," it means that it may include other elements as well, rather than excluding other elements, unless specifically stated otherwise.

In the drawings, a first direction may be defined as a direction in which a plurality of ceramic green sheets are stacked or a thickness (T) direction. Among a second direction and a third direction, the second direction may be defined as a length (L) direction, and the third direction may be defined as a width (W) direction.

FIGS. 4A-4E schematically illustrate a method of manufacturing a multilayer electronic component according to a comparative example.

FIG. 5 is a schematic diagram illustrating a sequence of a method of manufacturing a multilayer electronic component according to an example embodiment of the present disclosure.

Figure 6:
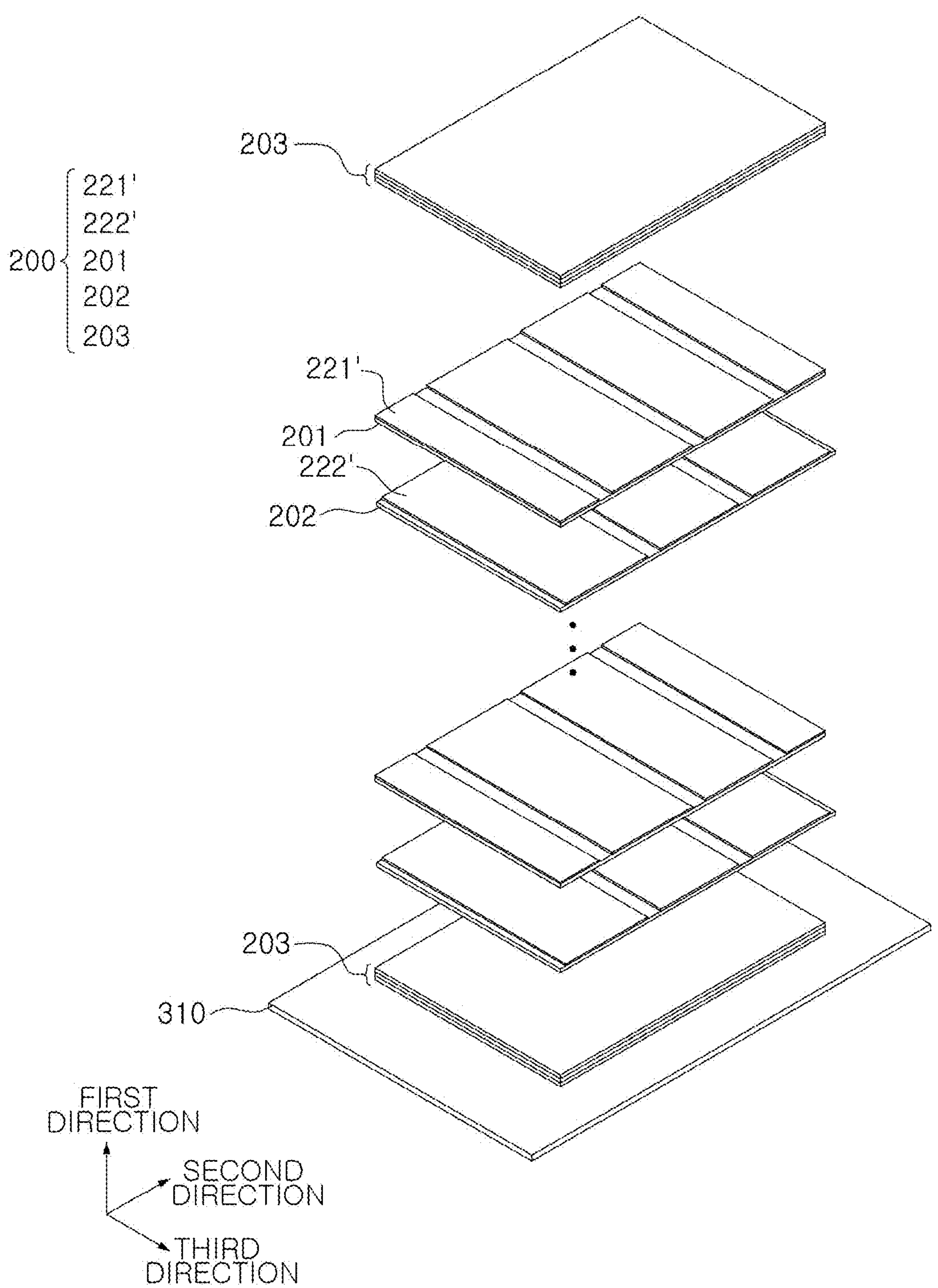
FIG. 6 is a schematic exploded perspective view illustrating an operation of forming a stack according to an example embodiment of the present disclosure.

FIG. 6 is a schematic exploded perspective view illustrating an operation of forming a stack according to an example embodiment of the present disclosure.

Figure 7:
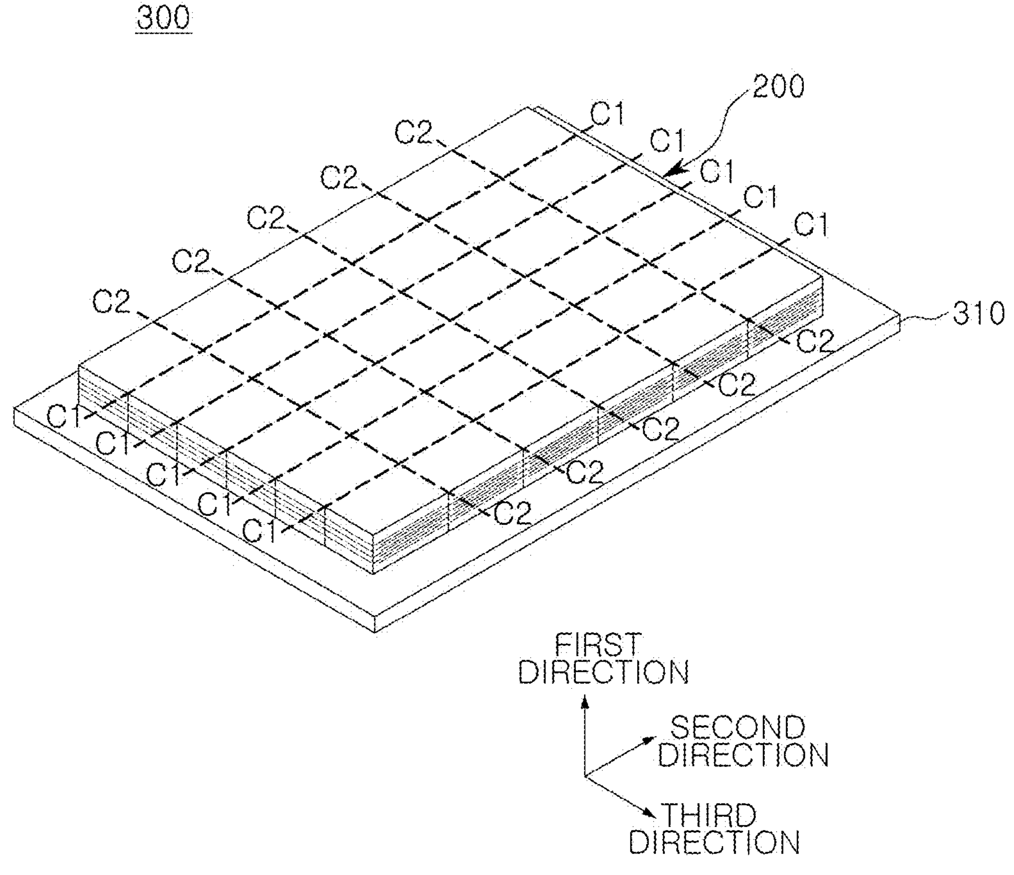
FIG. 7 is a schematic perspective view illustrating a stack cutting operation according to an example embodiment of the present disclosure.

FIG. 7 is a schematic perspective view illustrating a stack cutting operation according to an example embodiment of the present disclosure.

Figure 8:
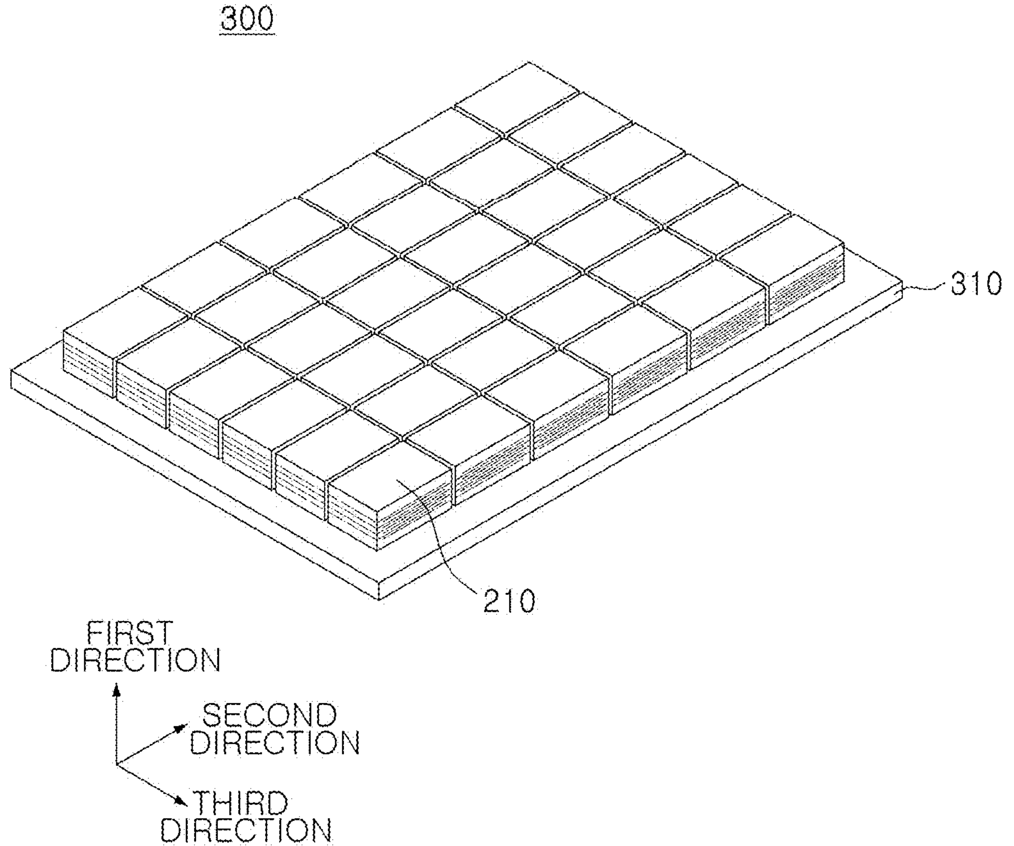
FIG. 8 is a schematic perspective view illustrating a form of a bar immediately after a stack cutting operation is performed according to an example embodiment of the present disclosure.

FIG. 8 is a schematic perspective view illustrating a form of a bar immediately after a stack cutting operation is performed according to an example embodiment of the present disclosure.

Figure 9:
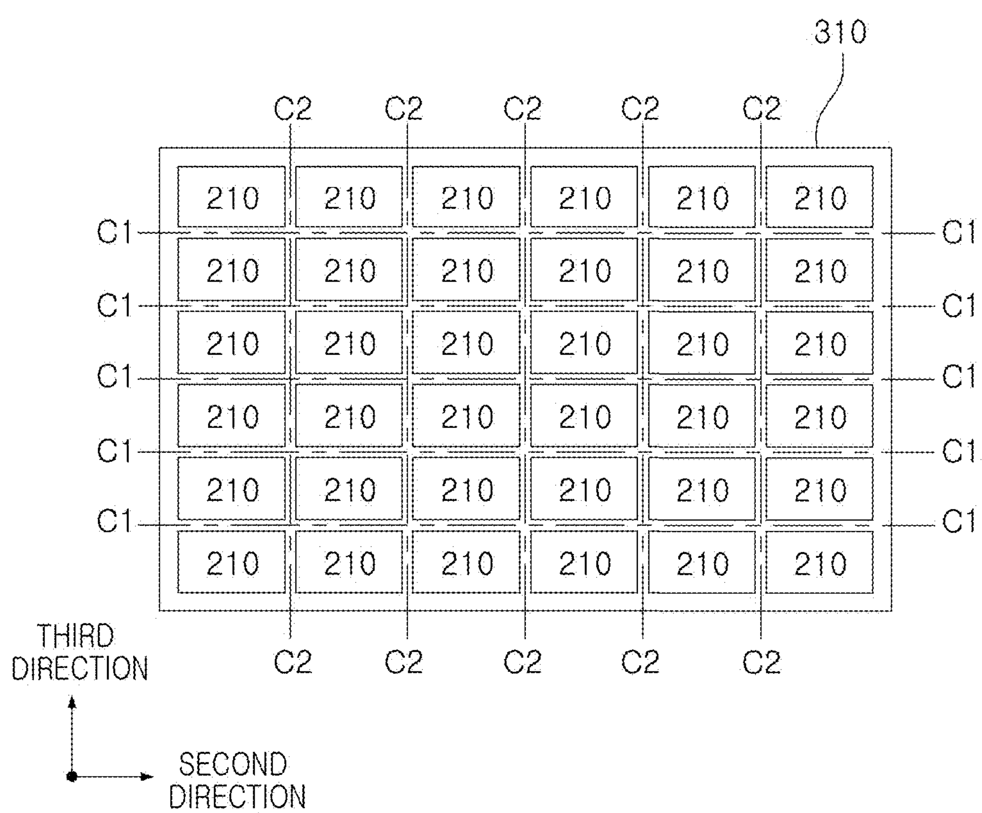
FIG. 9 is a plan view of a bar viewed in a first direction immediately after performing a stack cutting operation according to an example embodiment of the present disclosure.

FIG. 9 is a plan view of a bar viewed in a first direction immediately after performing a stack cutting operation according to an example embodiment of the present disclosure.

Figure 10:
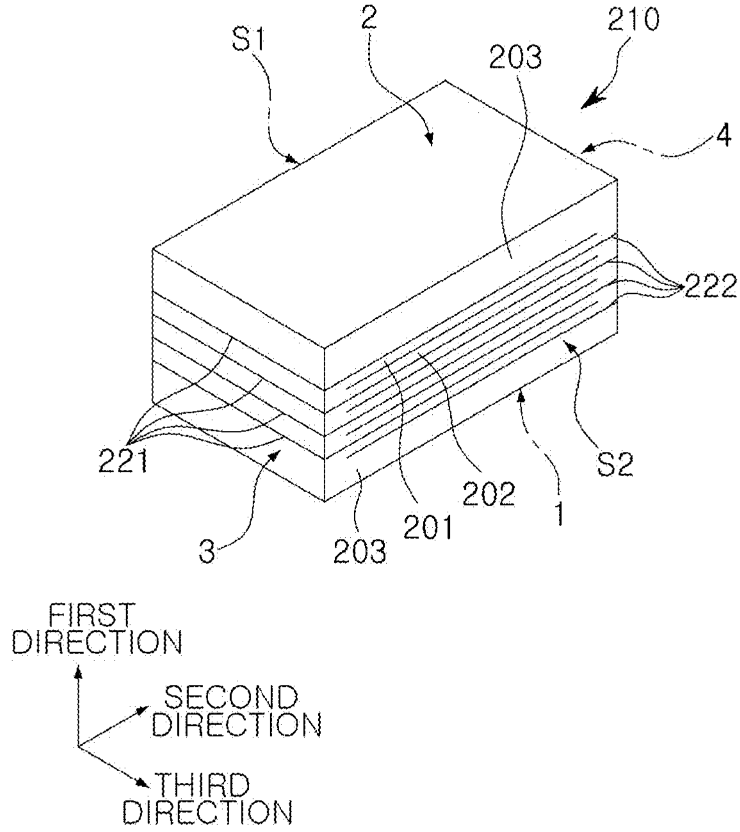
FIG. 10 is a schematic perspective view illustrating a shape of a unit chip according to an example embodiment of the present disclosure.

FIG. 10 is a schematic perspective view illustrating a shape of a unit chip according to an example embodiment of the present disclosure.

Figure 11:
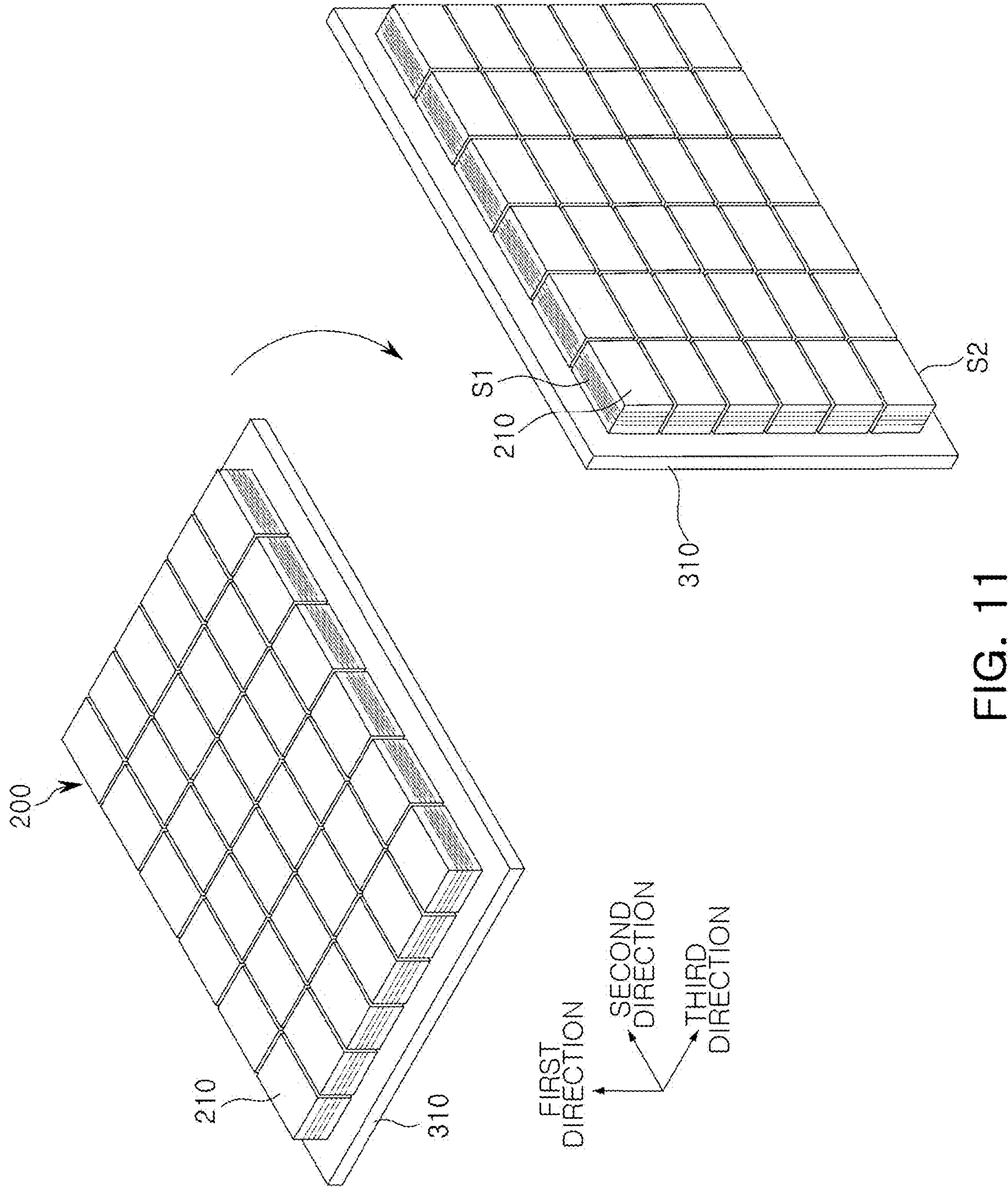
FIG. 11 is a schematic perspective view illustrating a support film rotation operation according to an example embodiment of the present disclosure.

FIG. 11 is a schematic perspective view illustrating a support film rotation operation according to an example embodiment of the present disclosure.

Figure 12:
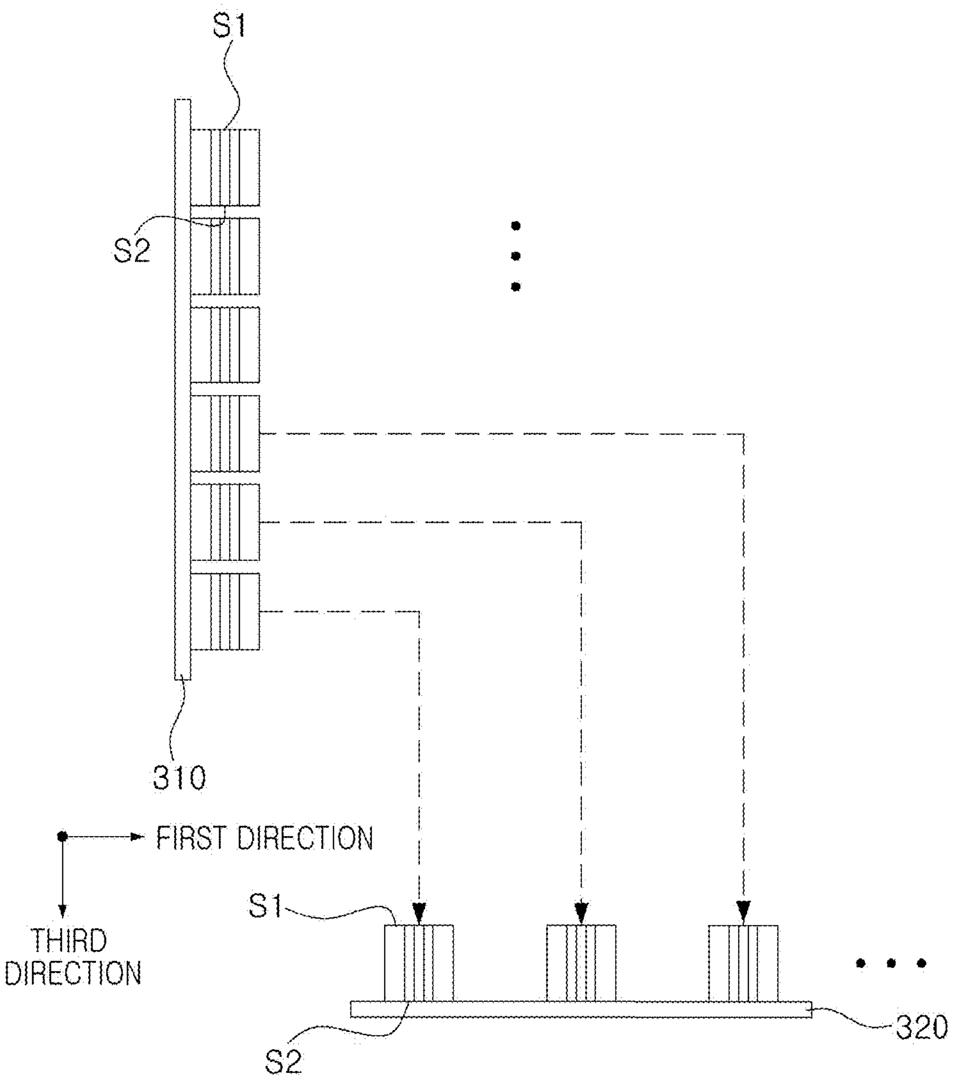
FIG. 12 is a schematic plan view illustrating an arrangement operation according to an example embodiment of the present disclosure.

FIG. 12 is a schematic plan view illustrating an arrangement operation according to an example embodiment of the present disclosure.

Figure 13:
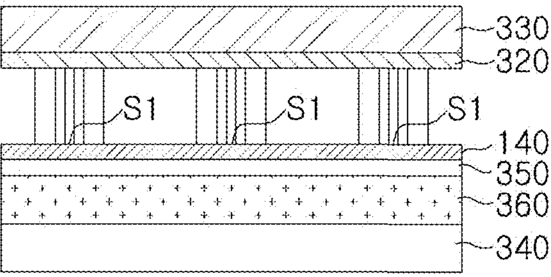
FIG. 13 is a schematic plan view illustrating a state in which a first side surface of a unit chip is attached to a ceramic green sheet for a side margin portion in a first side margin portion formation operation according to an example embodiment of the present disclosure.

FIG. 13 is a schematic plan view illustrating a state in which a first side surface of a unit chip is attached to a ceramic green sheet for a side margin portion in a first side margin portion formation operation according to an example embodiment of the present disclosure.

Hereinafter, a method of manufacturing a multilayer electronic component according to an example embodiment, another example embodiment, and various example embodiments of the present disclosure will be described in detail with reference to FIGS. 4A to 13.

Referring to FIGS. 5 to 14, a method of manufacturing a multilayer electronic component 100 according to an example embodiment of the present disclosure may include a stack forming operation P1 of forming a stack 200 by stacking a plurality of ceramic green sheets 201 and 202 on which conductive patterns 221' and 222' are disposed on a support film 310, a stack cutting operation P2 of cutting, when a direction in which the plurality of ceramic green sheets 201 and 202 are stacked relative to the stack 200 is defined as a first direction, the stack 200 in a second direction, perpendicular to the first direction, and cutting the stack 200 in a third direction, perpendicular to the first and second directions, to obtain a plurality of unit chips 210 such that the unit chip 210 includes a first internal electrode pattern 221 in which cut surfaces of the conductive patterns 221' are exposed to a surface 3 of the unit chip 210 in the second direction and first and second side surfaces S1 and S2 opposing each other in the third direction, and a second internal electrode pattern 222 in which the cut surfaces of the conductive patterns 222' are exposed to the other surface 4 of the unit chip 210 in the second direction and the first and second side surfaces S1 and S2, an arrangement operation P3 of separating the unit chip 210 from the support film 310, and then arranging the unit chip 210 such that the second side surface S2 of the unit chip 210 is in contact with adhesive tape 320, and a first side margin portion formation operation P4 of attaching the first side surface S1 to a ceramic green sheet for a side margin portion 140, and forming a first side margin portion 214.

P1: Stack Forming Operation

As illustrated in FIG. 6, in the operation P1 of manufacturing the stack 200, the plurality of ceramic green sheets 201 and 202 on which the conductive patterns 221' and 222' are disposed may be stacked on the support film 310.

The support film 310 may serve to support the stack 200 in which the conductive patterns 221' and 222' and the plurality of ceramic green sheets 201 and 202 are stacked. In this case, the support film 310 may include an adhesive material such as latex, starch, cellulose, protein, isoprene rubber (IR), nitrile butadiene rubber (NBR), styrene butadiene rubber (SBR), chloroprene rubber (CR), silicon rubber, a silicon-based material, a urethane-based material, an acryl-based material, and mixtures thereof.

The plurality of ceramic green sheets 201 and 202 may be formed of ceramic paste including ceramic powder, an organic solvent, a dispersing agent, and a binder. The ceramic powder may use a barium titanate-based material, a lead composite perovskite-based material, a strontium titanate-based material, or the like as a raw material for forming a dielectric layer 111 of the multilayer electronic component 100. The barium titanate-based material may include $BaTiO_3$-based ceramic powder. Examples of the ceramic powder may include $(Ba_{1-x}Ca_x)(Ti_{1-y}Zr_y)O_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), or $Ba(Ti_{1-y}Zr_y)O_3$ ($0<y<1$) obtained by partially dissolving Ca or Zr in $BaTiO_3$. When the plurality of ceramic green sheets 201 and 202 are sintered, the sintered ceramic green sheets 201 and 202 may become the dielectric layer 111 included in a body 110.

In an example embodiment, the stack 200 may further include a ceramic green sheet for a cover portion 203 forming cover portions 112 and 113. The ceramic green sheet for a cover portion 203 may be formed of a material and ingredient the same as those of the ceramic green sheets 201 and 202, but the present disclosure is not limited thereto. Through a sintering process, upper and lower cover portions 112 and 113 of the body 110 may be formed. In this case, the ceramic green sheet for a cover portion 203 may be formed on a surface and the other surface of a stack in the first direction, and may be formed of a single layer or a plurality of layers.

The conductive patterns 221' and 222' may be formed on the ceramic green sheets 201 and 202 using paste for an internal electrode including a conductive metal. The conductive metal included in the conductive patterns 221' and 222' is not particularly limited, and a material having excellent electrical conductivity may be used. For example, the conductive metal may include one or more of nickel (Ni), copper (Cu), palladium (Pd), silver (Ag), gold (Au), platinum (Pt), tin (Sn), tungsten (W), titanium (Ti), and alloys thereof. A method of forming the conductive patterns 221' and 222' on the ceramic green sheets 201 and 202 is not particularly limited. For example, the conductive paste for an internal electrode including the conductive metal may be formed by performing a screen-printing process or gravure printing process on the ceramic green sheets 201 and 202.

The conductive patterns 221' and 222' may have a stripe shape. Specifically, an internal electrode pattern may be formed to be in contact with opposite ends of the ceramic green sheets 201 and 202 in a third direction at regular intervals in a second direction.

The conductive patterns 221' and 222' may include a first conductive pattern 221' formed on the ceramic green sheet 201 and a second conductive pattern 222' formed on another ceramic green sheet 202. In this case, the ceramic green sheet on which the first conductive pattern 221' is formed may be referred to as a first ceramic green sheet 201, and the ceramic green sheet on which the second conductive pattern 222' is formed may be referred to as a second ceramic green sheet 202.

As illustrated in FIG. 6, the plurality of ceramic green sheets 201 and 202 may be alternately stacked such that the first conductive patterns 221' and the second conductive patterns 222' are cross-stacked. Accordingly, when the unit chip 210 to be described below is formed, the first conductive pattern 221' may form the first internal electrode pattern 221 exposed to the first side surface S1, the second side surface S2, and a third surface 3, and the second conductive pattern 222' may form the second internal electrode pattern 222 exposed to the first side surface S1, the second side surface S2, and a fourth surface 4. The first internal electrode pattern 221 may become the first internal electrode 121 after sintering, and the second internal electrode pattern 222 may become the second internal electrode 122 after sintering.

In the present disclosure, for ease of description, a direction in which a plurality of ceramic green sheets disposed on the support film 310 are stacked will be described as a first direction.

P2: Stack Cutting Operation

Referring to FIGS. 7 to 9, when a direction in which the plurality of ceramic green sheets are stacked relative to the stack 200 is defined as a first direction, the stack 200 may be cut in a second direction, perpendicular to the first direction, and may be cut in a third direction, perpendicular to the first and second directions, to obtain the plurality of unit chips 210, such that the unit chip 210 includes the first internal electrode pattern 221 in which cut surfaces of the conductive patterns 221' are exposed to a surface 3 of the unit chip 210 in the second direction and first and second side surfaces S1 and S2 opposing each other in the third direction, and a second internal electrode pattern 222 in which the cut surfaces of the conductive patterns 222' are exposed to the other surface 4 of the unit chip 210 in the second direction and the first and second side surfaces S1 and S2.

As illustrated in FIG. 7, the stack 200 may be cut along cutting lines C1-C1 and C2-C2 orthogonal to each other. The cutting lines C1-C1, cutting lines parallel to the second direction, may be substantially equally spaced from each other in the third direction, and the cutting lines C2-C2, cutting lines parallel to the third direction, may be substantially equally spaced from each other in the second direction. The unit chip 210 having a substantially uniform size in the third direction may be formed by the cutting lines C1-C1, and the unit chip 210 having a substantially uniform size in the second direction may be formed by the cutting lines C2-C2.

In particular, the cutting line C2-C2 may be formed to cut a space in which central portions of the first and second conductive patterns 221' and 222' in the second direction and the first and second conductive patterns 221' and 222' are spaced apart from each other in the second direction. The first internal electrode pattern 221 of the unit chip 210 may be exposed the first side surface S1, the second side surface S2, and the third surface 3, a surface in the second direction. The second internal electrode pattern 222 may be exposed to the first side surface S1, the second side surface S2, and the fourth surface 4, the other surface in the second direction.

A means for cutting the stack 200 are not particularly limited. For example, a blade cutting method such as a doctor blade or a dicing blade, a guillotine cutting method, or a laser cutting method may be used for the stack 200.

Referring to FIGS. 8 and 9, it can be seen that the stack 200 is formed of the plurality of unit chips 210 immediately after the stack cutting operation P2 is performed. The plurality of unit chips 210 may be attached to the support film 310 even after being cut due to the adhesiveness of the support film 310.

FIGS. 8 and 9 illustrates that the plurality of unit chips 210 are spaced apart from each other at regular intervals by cutting. However, the plurality of unit chips 210 may be substantially in contact with each other in a state in which adhesive force is weakened by the viscosity of the plurality of ceramic green sheets 201 and 202 and the internal electrode patterns 221 and 222.

However, it is not excluded that the plurality of unit chips are spaced apart from each other, and the plurality of unit chips may be partially spaced apart depending on a cutting means. However, a size of a space between each of the plurality of unit chips spaced apart from each other may be narrower than a space in which adjacent unit chips are rotatable without being in contact with each other.

Referring to FIG. 10, the first and second internal electrode patterns 221 and 222 of the plurality of unit chips 210 according to an example embodiment of the present disclosure may be simultaneously exposed to the first and second side surfaces S1 and S2 of the unit chip 210 opposing each other. Accordingly, capacitance per unit volume of the multilayer electronic component 100 may be improved by maximizing an area in which the internal electrode patterns 221 and 222 are formable. However, the first and second side surfaces S1 and S2 to which the first and second internal electrode patterns 221 and 222 are simultaneously exposed may be vulnerable to external moisture penetration. When external electrodes to be described below are formed to extend to the first and second side surfaces S1 and S2, a short circuit may occur.

In the first side margin portion formation operation P4 to be described below according to an example embodiment of the present disclosure, a ceramic green sheet for a side margin portion may be attached to the first side surface S1 and punched to form a first side margin portion, thereby solving issues associated with moisture-resistant reliability and occurrence of a short circuit.

In FIGS. 6 to 9, it is illustrated that the stack forming operation P1 and the stack cutting operation P2 are performed in a state in which the support film 310 is disposed to be substantially horizontal to the ground, but the present disclosure is limited thereto. That is, in an example embodiment, the stack forming operation P1 and the stack cutting operation P2 may be performed in a state in which the support film 310 is disposed to be substantially perpendicular to the ground, and the adhesive tape 320 to be described below may be disposed to be substantially horizontal to the ground and the arrangement operation P3 to be described below may be performed, thereby opening one of the first and second side surfaces S1 and S2. In one example, the meaning of the term "substantially perpendicular (or horizontal or parallel)" may include a process error occurring in the manufacturing process, a measurement error, or the like, recognizable by one of ordinary skill in the art. For example, the configuration in which elements being substantially perpendicular (or horizontal or parallel) may include the example in which the elements are perpendicular (or horizontal or parallel) to each other, and also the example in which a minute difference may exist due to a process error occurring in the manufacturing process, a measurement error, or the like, recognizable by one of ordinary skill in the art.

P3: Arrangement Operation Referring to FIGS. 4A-4E, Related Art 1, a comparative example, discloses, a method of forming a ceramic protective layer 22 on first cut side surfaces 20 of a plurality of green chips 19.

Figures 4A, 4B, 4C, 4D, 4E:
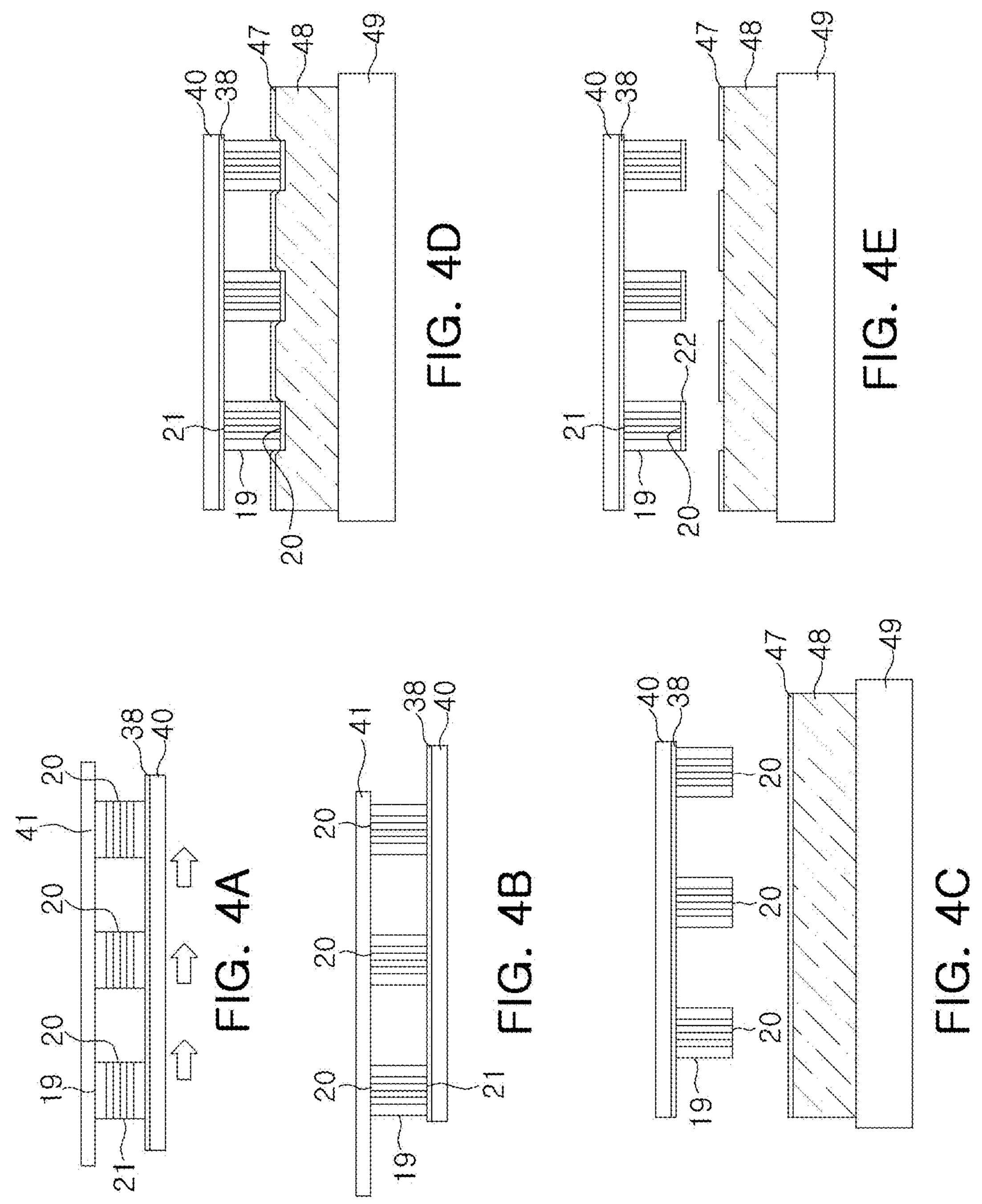
FIGS. 4A-4E schematically illustrate a method of manufacturing a multilayer electronic component according to a comparative example.

Specifically, in Related Art 1, the green chip 19 may be disposed on a support 40 together with an adhesive sheet 38, and a tumbling action plate 41 may be disposed on an upper surface of the green chip 19 (FIG. 4A). Thereafter, a tumbling process may be performed to rotate the plurality of green chips 19 by 90 degrees at once by moving the support 40 in an arrow direction 42 relative to the tumbling action plate 41 (FIG. 4B).

Thereafter, when the tumbling action plate 41 is removed, the first cutting side surfaces 20 of the plurality of green chips 19 may be uniformly open. Thereafter, a ceramic green sheet for a side surface 47 may be disposed to oppose the open first cut side surface 20, and the ceramic green sheet for a side surface 47 may be disposed on an elastic pad for adhesion 48 on a fixing table 49 (FIG. 4C). Subsequently, an adhesive may be applied to the ceramic green sheet 47 for a side surface 47 or the open first cut side surface 20, and the ceramic green sheet for a side surface 47 may be pressed to the first cut side surface 20 of the green chip 19 such that the elastic pad for adhesion 48 is deformed (FIG. 4D), and shear force may be applied to the ceramic green sheet for a side surface 47 to perform a punching process in which a hole is drilled to correspond to a size of the first cut side surface 20 (FIG. 4E).

According to Related Art 1, in order to expose the cut side surfaces 20 of the plurality of green chips 19 upwards, the support 40 may need to be moved relative to the tumbling action plate 41 in an arrow direction, such that the plurality of green chips 19 may cause shear stress. In particular, in the process of rotating the green chip 19 using an edge as a rotational axis, excessive stress may be concentrated on the edge used as the rotational axis of the green chip 19. In particular, the green chip 19 having the ceramic protective layer 22 may be then subjected to a sintering process at 900 to 1300° C. The edge of the green chip 19 on which excessive stress is concentrated may be easily damaged by such thermal shock. After sintering, cracks may occur between a capacitance formation portion and a cover portion of a body, thereby degrading reliability of a multilayer electronic component.

In addition, the green chip 19 according to Related Art 1 may be smoothly rotated only when the green chip 19 is simultaneously in contact with the support 40 and the tumbling action plate 41. Due to size distribution of the plurality of green chips 19, the green chip 19 not in contact with the support 40 or the tumbling action plate 41 among the plurality of green chips 19 may occur. In this case, among the plurality of green chips 19, the green chip 19 not in contact with the support 40 or the tumbling action plate 41 may not be rotated even after a rotation process. Accordingly, an issue in which the ceramic protective layer 22 is formable on the green chip 19 may occur.

FIG. 12 is a schematic plan view illustrating an arrangement operation according to an example embodiment of the present disclosure.

In the arrangement operation P3 according to an example embodiment of the present disclosure, the unit chip 210 may be separated from the support film 310, and then may be arranged such that the second side surface S2 of the unit chip 210 is in contact with the adhesive tape 320.

Thus, when the unit chip 210 is separated from the support film 310, the separation may be performed without a specific rotational axis. Accordingly, as disclosed in Related Art 1, a phenomenon in which a portion of the unit chip 210 rotates in a state of being in contact with the support film 310 may not occur.

Accordingly, as a portion of the unit chip 210 rotates in a state of being attached to the support film 10, it is possible to prevent stress from being concentrated on an edge of the unit chip 210. Accordingly, when the multilayer electronic component 100 is manufactured through a process to be described below, it is possible to suppress cracks occurring at the boundary between a capacitance formation portion Ac and cover portions 112 and 113.

In addition, according to an example embodiment of the present disclosure, when the unit chip 210 is separated from the support film 310 in the first direction, a direction in which the ceramic green sheets 201 and 202 are stacked, it may not be necessary to apply pressure to exposed portions of the internal electrode patterns 221 and 222, thereby preventing damage to the first and second side surfaces S1 and S2 of the unit chip 210 vulnerable to moisture penetration.

In addition, the unit chip 210 may be separated from the support film 310 without rotating the unit chip 210, thereby preventing adhesion of adjacent unit chips 210 and non-movement and non-rotation due to size distribution of the unit chips 210.

That is, the method of manufacturing a multilayer electronic component according to an example embodiment of the present disclosure may include the arrangement operation P3 of separating the unit chip 210 from the support film 310, and then arranging the unit chip 210 such that the second side surface S2 of the unit chip 210 is in contact with the adhesive tape 320, thereby preventing damage, non-movement, and non-rotation of the plurality of unit chips 210 in the process of attaching the ceramic green sheet for a side margin portion 140 to the first side surface S1 to improve manufacturing yield of the multilayer electronic component.

In an example embodiment, the arrangement operation P3 may be performed by separating the unit chip 210 in the first direction, a direction in which the ceramic green sheets 201 and 202 are stacked, and then arranging the unit chip 210 to move in a direction, perpendicular to a direction in which the unit chip 210 is separated, such that the second side surface S2 of the unit chip 210 is in contact with the adhesive tape 320.

Accordingly, not only rotation of the unit chip 210 may not occur while separating the unit chip 210 from the support film 310, but also rotation of the unit chip 210 may not occur while being moved to the adhesive tape 320 and arranged thereon.

From a similar point of view, in another example embodiment of the present disclosure, an arrangement operation of separating the unit chip 210 from the support film 310 without rotating the unit chip 210, and then arranging the unit chip 210 such that the second side surface S2 of the unit chip 210 is in contact with the adhesive tape 320 may be included after the stack forming operation P1 and the stack cutting operation P2 are performed.

Accordingly, rotation of the unit chip 210 itself may not occur in the process of separating the unit chip 210 from the support film 310, thereby minimizing stress concentrated on an edge of the unit chip 210 or friction occurring between the unit chip 210 and the support film 310. Accordingly, when the unit chip 210 rotates in a state of being attached to the support film 310, it is possible to prevent stress from being concentrated on the edge of the unit chip 210 disclosed in Related Art 1. Accordingly, when the multilayer electronic component 100 is manufactured through a process to be described below, it is possible to suppress cracks occurring at a boundary between the capacitance formation portion Ac and the cover portions 112 and 113.

In this case, during the arrangement process, the unit chip 210 separated from the support film 310 may be arranged such that the second side surface S2 is in contact with the adhesive tape 320 to be described below, without rotating the unit chip 210. That is, according to an example embodiment, in addition to a point in time at which the unit chip 210 is separated from the support film 310, the unit chip 210 may not rotate while the separated unit chip 210 is moved and disposed on the adhesive tape 320. Accordingly, even when the plurality of unit chips 210 are simultaneously moved and disposed on the adhesive tape 320, it is possible to prevent damage to the unit chip 210 caused by rotation, and to simplify a process.

Thereafter, the separated unit chip 210 may be moved in a direction, perpendicular to the first direction, and arranged such that the second side surface S2 of the unit chip 210 is in contact with the adhesive tape 320. Accordingly, the first side surface S1 of the unit chip 210 may be open upwards or downwards without interference from adjacent unit chips 210.

In the process of moving the separated unit chip 210 in a direction, perpendicular to the first direction, and arranging the separated unit chip 210 on the adhesive tape 320, an arrangement of the plurality of unit chips 210 formed on the support film 310 may be different from an arrangement of the plurality of unit chips 210 formed on the adhesive tape 320. For example, an interval between each of the plurality of unit chips 210 formed on the adhesive tape 320 may be wider than the interval between each of the plurality of unit chips 210 formed on the support film 310.

Accordingly, interference between adjacent unit chips 210 may be minimized when the first side margin portion formation operation P4 to be described below is performed. In addition, a process for widening the interval between each of the plurality of unit chips 210 may not be required, thereby simplifying the method of manufacturing a multilayer electronic component.

A method of arranging the unit chip 210 such that the second side surface S2 of the unit chip is in contact with the adhesive tape 320 by moving the unit chip 210 in a direction, perpendicular to the first direction, is not particularly limited.

FIG. 11 is a schematic perspective view illustrating a support film rotation operation according to an example embodiment of the present disclosure. Referring to FIG. 11, in an example embodiment, the method of manufacturing a multilayer electronic component may further include a support film rotation operation of rotating a support film between the stack cutting operation P2 and the arrangement operation P3. In this case, the stack forming operation P1 and the stack cutting operation P2 may be performed in a state in which the support film 310 is disposed to be substantially parallel to the ground, and the support film 310 may be disposed to be substantially perpendicular to the ground by the support film rotation operation. Accordingly, the bar 300 may be integrally rotated without separation between the support film 310 and the plurality of unit chips 210, such that the first side surface S1 or the second side surface S2 may be aligned in a direction toward the adhesive tape 320 to be described below without damaging the plurality of unit chips 210.

Immediately after the stack cutting operation P1 is performed, the interval between each of the plurality of unit chips 210 may be sufficiently narrow to be seen as the plurality of unit chips 210 substantially in contact with each other, as described above. In this case, when the support film rotation operation is further included immediately after the stack cutting operation P2 is performed, as in the method of manufacturing a multilayer electronic component according to an example embodiment, a separation distance between each of the plurality of unit chips 210 immediately after the stack cutting operation P1 is performed may be substantially the same during the support film rotation operation. Accordingly, when the plurality of unit chips 210 are simultaneously separated in the arrangement operation P3, it is possible to lessen a phenomenon in which the unit chip 210 remain on the support film 310 without being separated.

However, the support film rotation operation is not an essential element of the present disclosure. Even when the adhesive tape 320 to be described below is disposed to be perpendicular to the support film 310 without the support film rotation operation, the first side surface S1 or the second side surface S2 may be aligned in a direction toward the adhesive tape 320.

In addition, the support film rotation operation may not need to be performed between the stack cutting operation P2 and the arrangement operation P3. For example, the method of manufacturing a multilayer electronic component according to an example embodiment may further include a support film rotation operation of rotating the support film 310 between the stack forming operation P1 and the stack cutting operation P2.

Rotation in an operation of rotating the support film 310 may be performed such that the support film 310 is rotated 90 degrees clockwise or counterclockwise relative to the initial support film 310, such that the support film 310 and the adhesive tape 320 to be described below may be disposed to be perpendicular to each other, but the present disclosure is not limited thereto.

In the process of moving the separated unit chip 210 in a direction, perpendicular to the first direction, and arranging the unit chip 210 such that the second side surface S2 of the unit chip 210 is in contact with the adhesive tape 320, a position of the adhesive tape 320 is not particularly limited. However, in order to simplify a process and more effectively prevent rotation of the unit chip 210, the position of the adhesive tape 320 may be adjusted to be close to the second side surface S2 of the unit chip 210. That is, in an example embodiment, the arrangement operation P3 may be an operation of separating the unit chip 210 from the support film 310 in the first direction, and then arranging the unit chip 210 such that the second side surface S2 of the unit chip 210 is in contact with the adhesive tape 320 disposed to be parallel to the first and second side surfaces S1 and S2 of the unit chip 210 and disposed to be close to the second side surface S2 among the first and second side surfaces S1 and S2.

As described above, a tumbling process disclosed in Related Art 1 may be a process in which the green chip 19 rotates using an edge as a rotational axis. In such a process, excessive stress may be concentrated on the edge of the green chip 19 in contact with the adhesive sheet 38 or the tumbling action plate 41.

However, in an example embodiment, separating the unit chip 210 from the support film 310 may refer to allowing the unit chip 210 to be completely separated from the support film 310. Thus, the first side surface S1 or the second side surface S2 of the unit chip 210 may be open without a process in which the unit chip 210 rotates in a state in which an edge of the unit chip 210 is in contact with the support film 310, thereby suppressing the concentration of stress on the edge of the unit chip 210.

Hereinafter, a specific method of arranging the plurality of unit chips 210 on the adhesive tape 320 in the arrangement operation P3 will be described.

Figure 15:
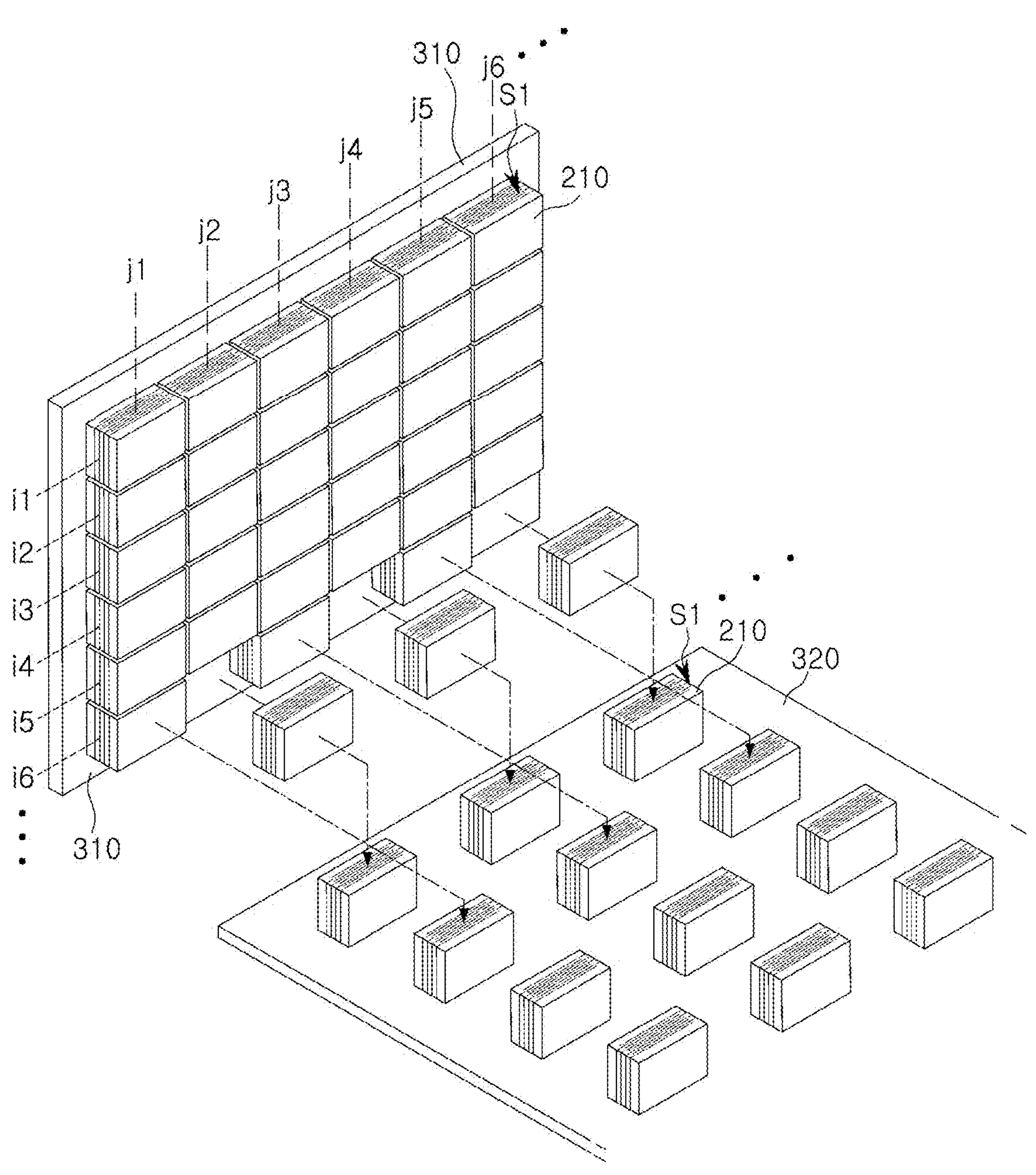
FIG. 15 is a schematic perspective view illustrating an arrangement operation according to an example embodiment.

Referring to FIGS. 15 and 16, the plurality of unit chips 210 may be in a state of being arranged in directions of rows i1, i2, i3, i4, i5, i6, . . . And columns j1, j2, j3, j4, j5, j6, . . . An arrangement of the plurality of unit chips 210 disposed on the support film 310 immediately after the stack cutting operation P2 is performed may be different from an arrangement of the plurality of unit chips 210 disposed on the adhesive tape 320 immediately after the arrangement operation P3 is performed. Different arrangements may mean that a separation distance between each of the plurality of unit chips 210 before the arrangement operation P3 is performed is different from a separation distance between each of the plurality of unit chips 210 after the arrangement operation P3 is performed, and open surfaces of the plurality of unit chips 210 before the arrangement operation P3 is performed is different from open surfaces of the plurality of unit chips 210 after the arrangement operation P3 is performed.

FIG. 15 is a schematic perspective view illustrating an arrangement operation according to an example embodiment.

Referring to FIG. 15, the arrangement operation P3 according to an example embodiment may be an operation of separating unit chips 210 disposed in even columns of the same row and unit chips 210 disposed in odd columns of the same row, and disposing the separated unit chips 210 on the adhesive tape 320.

For example, the arrangement operation P3 may be an operation of separating unit chips disposed in even columns j2, j4, j6, . . . of the same row i6 and disposing the unit chips on the adhesive tape 320, and separating unit chips disposed in odd columns i1, i3, i5, . . . of the same row i6 and disposing the unit chips on the adhesive tape 320. The same row may refer to all rows forming an arrangement of the plurality of unit chips 210, and the order of separating the unit chips 210 disposed in the even columns of the same row and the unit chips 210 disposed in the odd columns of the same row is not particularly limited.

Figure 16A:
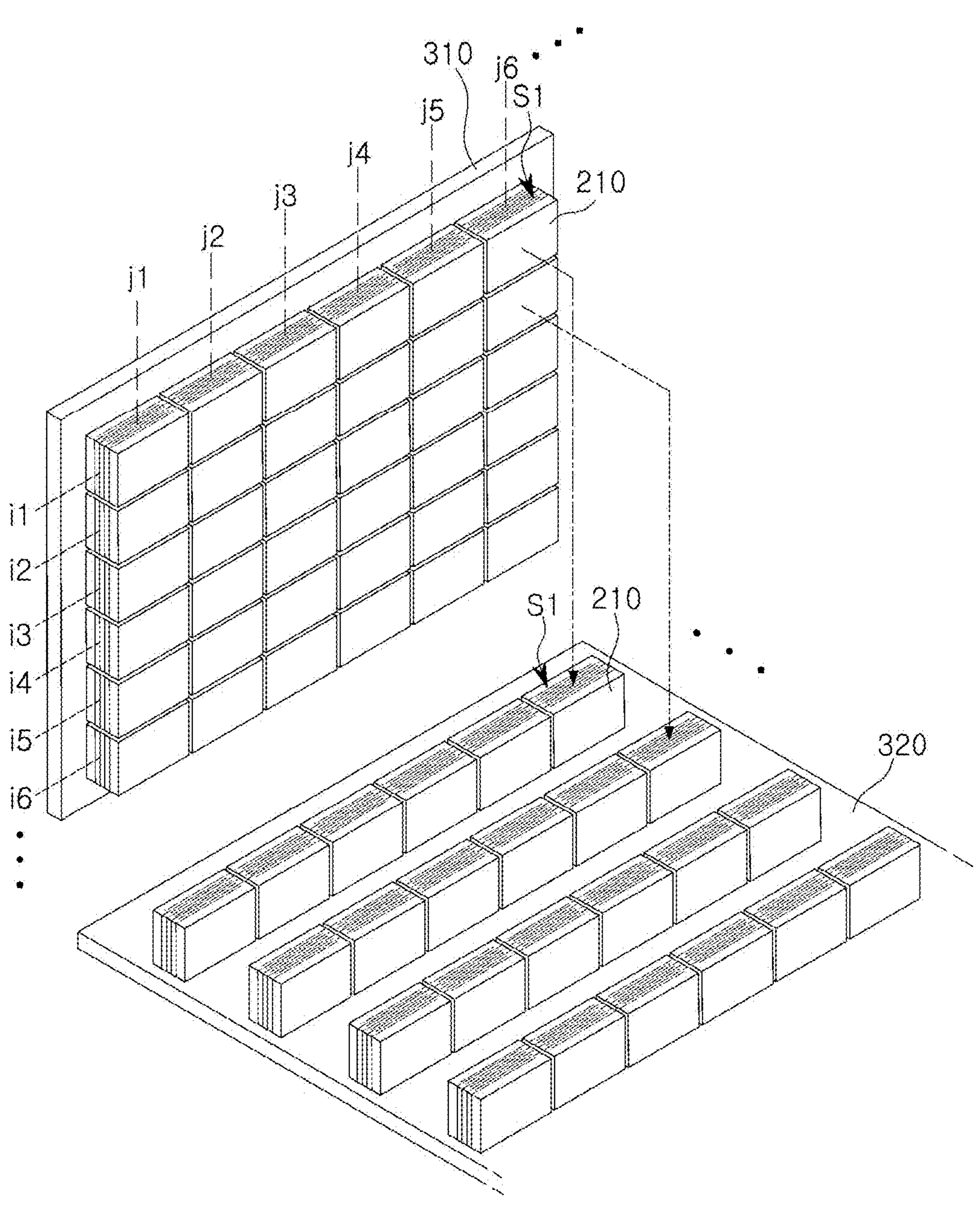
FIGS. 16A and 16B are schematic perspective views illustrating an arrangement operation according to an example embodiment.
Figure 16B:
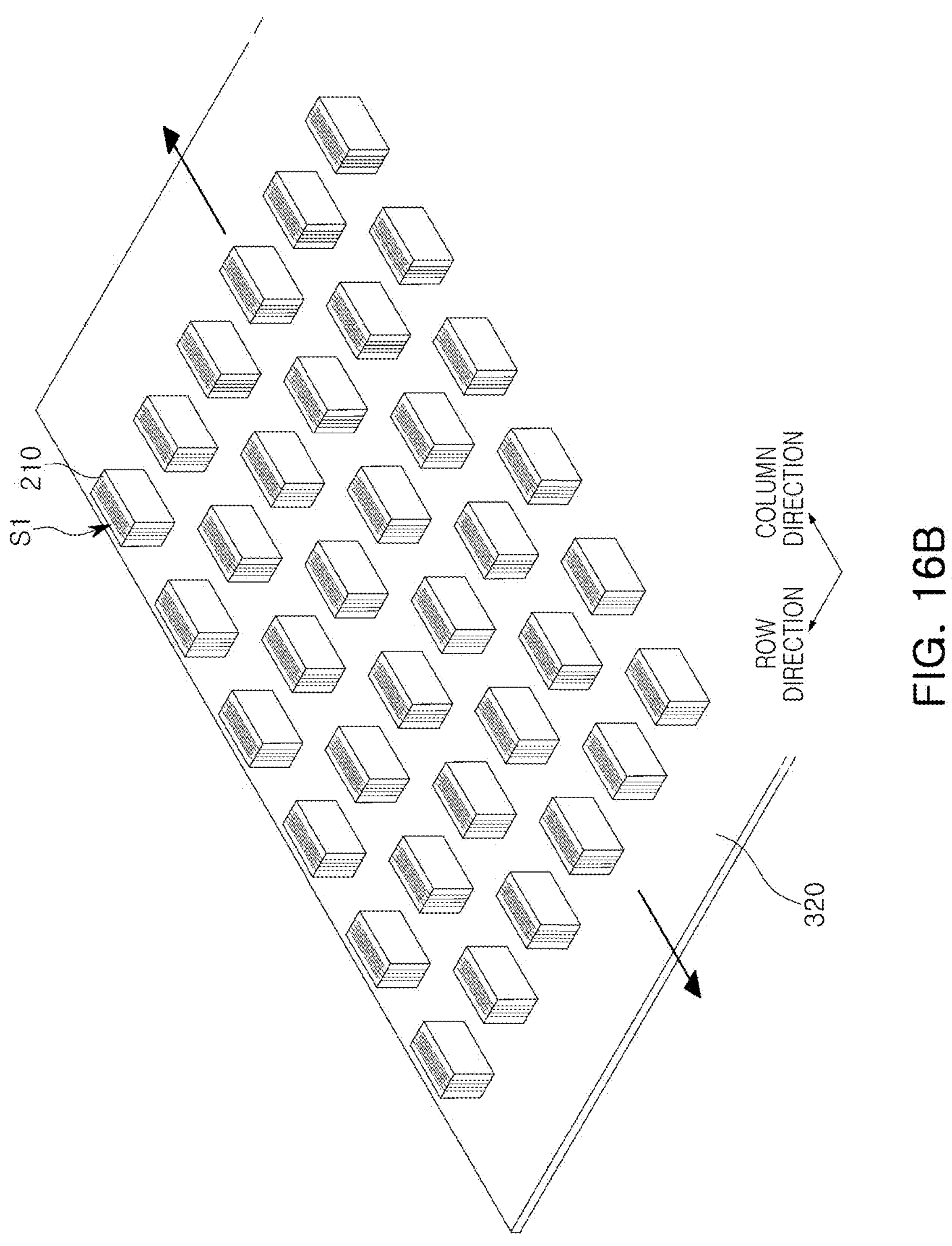

FIGS. 16A and 16B are schematic perspective views illustrating an arrangement operation according to an example embodiment.

Referring to FIG. 16A, the arrangement operation P3 according to an example embodiment may be an operation of simultaneously separating unit chips 210 disposed in a row and disposing the unit chips on the adhesive tape 320.

For example, the arrangement operation P3 may be an operation of simultaneously separating unit chips 210 disposed in row i1, which is one row, and disposing the unit chips 210 on the adhesive tape 320. That is, the arrangement operation P3 may be an operation of repeatedly performing an operation of separating all unit chips 210 disposed in row i1, which is a row, and disposing the unit chips 210 on the adhesive tape 320, and separating all unit chips 210 disposed in any one row among the remaining rows and disposing the unit chips 210 on the adhesive tape 320.

When all of the plurality of unit chips 210 disposed on the support film 310 are disposed on the adhesive tape 320 according to such a method, an interval between each of the plurality of unit chips 210 belonging to a row may not be appropriate to perform the first side margin formation operation P4 to be described below. For example, when a plurality of unit chips disposed in row i1 are simultaneously separated and disposed on the adhesive tape 320, an interval between each of the plurality of unit chips 210 disposed on the adhesive tape 320 and derived from row i1 may be substantially the same as an interval between the unit chips 210 disposed on the support film 310. Accordingly, when the first side margin formation operation P4 to be described below is performed, punching may not be smoothly performed due to an insufficient interval between adjacent unit chips 210, and interference may occur between the adjacent unit chips 210, Referring to FIG. 16B, the arrangement operation according to an example embodiment may be an operation of pulling the adhesive tape 320, on which the unit chips 210 disposed in a row are disposed, in a column direction to allow the unit chips 210 to be spaced apart from each other. Accordingly, a sufficient separation distance may be secured between each of the plurality of unit chips 210 disposed on the adhesive tape 320.

P4: First Side Margin Portion Formation Operation

The method of manufacturing a multilayer electronic component according to an example embodiment of the present disclosure may include the first side margin formation operation P4 of attaching a first side surface to a ceramic green sheet for a side margin portion and forming a first side margin portion 214 after the arrangement operation P3.

Figure 14:
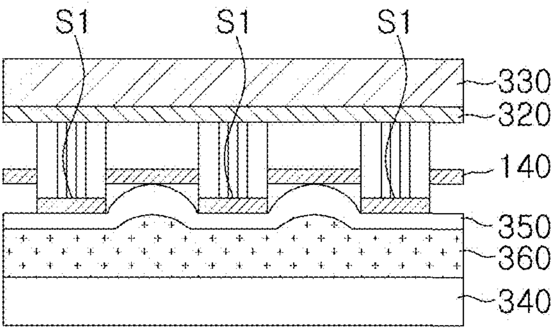
FIG. 14 is a schematic plan view illustrating a state in which a ceramic green sheet for a side margin portion attached to a first side surface of a unit chip is punched in a first side margin portion formation operation according to an example embodiment of the present disclosure.

Hereinafter, the first side margin portion formation operation P4 will be described based on a case in which the first side surface S1 of the unit chip 210 is open with reference to FIGS. 13, 14, and 17, but may be also applied to a case in which the second side surface S2 is open in the same manner.

The ceramic green sheet for a side margin portion 140 may be formed of ceramic paste including ceramic powder including a barium titanate-based material, a lead composite perovskite-based material, or a strontium titanate-based material, an organic solvent, a dispersing agent, a binder in the same manner as the ceramic green sheets 201 and 202 described above. However, the ceramic green sheet for a side margin portion 140 may not need to have a composition the same as those of the ceramic green sheets 201 and 202 described above, and may have a different composition. Accordingly, margin portions 114 and 115 after sintering may have an average particle size, density, or hardness different from that of the dielectric layer 111.

A method of attaching the ceramic green sheet for a side margin portion 140 to the first side surface S1 of the unit chip 210 is not particularly limited. For example, when pressed, an elastic pad 360 may be used for pressing. Specifically, referring to FIG. 13, the ceramic green sheet for a side margin portion 140 may be attached to the first side surface S1 by pressing in a state in which an upper support 330 is disposed on a surface of the adhesive tape 320 on which the plurality of unit chips 210 are not disposed, and the elastic pad 360 and the ceramic green sheet for a side margin portion 140 are sequentially stacked on a lower support 340. In this case, in an example embodiment, the ceramic green sheet for a side margin portion 140 may be attached to the first side surface S1 at a temperature of 50 to 150° C. to prevent deformation or cracking of the ceramic green sheet for a side margin portion 140.

A method of forming the side margin portion 214 using the ceramic green sheet for a side margin portion 140 attached to the first side surface S1 of the unit chip 210 is not particularly limited.

For example, after the ceramic green sheet for a side margin portion 140 is attached, the ceramic green sheet for a side margin portion 140 may be pressed to the extent that the elastic pad 360 is elastically deformed, such that punching may be performed to cut a portion of the ceramic green sheet for a side margin portion 140 corresponding to the first side surface S1. By such punching, the portion of the ceramic green sheet for a side margin portion 140 corresponding to the first side surface S1 may be cut to form the first side margin portion 214. The first side margin portion 214 may form the margin portion 114 of the multilayer electronic component through a subsequent sintering process.

In an example embodiment, in the first side margin portion formation operation P4, the attachment and punching of the ceramic green sheet for a side margin portion 140 may be performed in a state in which the ceramic green sheet for a side margin portion 140 is attached to a carrier film 350. Accordingly, rapidly drying of the ceramic green sheet for a side margin portion 140 may be prevented without applying an adhesive to the first side surface S1 or the ceramic green sheet for a side margin portion 140, thereby securing sufficient adhesive force for attaching the ceramic green sheet for a side margin portion 140 to the first side surface S1. That is, in an example embodiment, an adhesive ingredient may not be coated on a surface of the ceramic green sheet for a side margin portion 140 in contact with the first side surface S1.

In addition, in an example embodiment, since rapid drying of the ceramic green sheet for a side margin portion 140 is prevented, punching may be performed at 50° C. or lower. Accordingly, it may not be necessary to maintain high temperature to form a side margin portion, thereby alleviating damage to the unit chip 210 or the ceramic green sheet for a side margin portion 140 caused by thermal shock.

An ingredient of the carrier film 350 are not particularly limited. In an example embodiment, the carrier film 350 may include polyethylene terephthalate (PET), polyolefin (PO), polypropylene (PP), and silicon (Si). Accordingly, rapid drying of the ceramic green sheet for a side margin portion 140 attached to the carrier film 350 may be effectively prevented. In addition, a thickness of the carrier film 350 is not particularly limited, but the thickness may be preferably 10 μm or more to properly form a side margin portion, and may be preferably 30 μm or less to facilitate punching of a ceramic green sheet for a side margin portion.

The method of manufacturing a multilayer electronic component according to an example embodiment may further include a second side margin portion formation operation of forming a second side margin portion 215 by attaching the second side surface S2 of the unit chip 210 to the ceramic green sheet for a side margin portion 140 and punching the ceramic green sheet for a side margin portion 140 after the first side margin portion formation operation P4.

The second side margin portion formation operation may be performed in the same manner as the first side margin portion formation operation P4, except that attachment and punching of the ceramic green sheet for a side margin portion 140 is performed on the second side surface S2 of the unit chip 210.

Specifically, after the first side margin portion formation operation P4, the cut ceramic green sheet 140 for a side margin portion except for the first side margin portion 214 may be removed, and the carrier film 350, the elastic pad 360, and the lower support 340 may be removed. Thereafter, another adhesive tape may be attached to a surface on which the first side margin portion 214 is formed, and then the existing adhesive tape 320 and the upper support 330 may be removed to open the second side surface S2 of the unit chip 210. When the first side margin portion formation operation P4 is equally applied to the open second side surface S2, the unit chip 210 having first and second side margin portions 214 and 215 formed thereon may be formed.

In the operation of forming the first and second side margin portions, a ceramic green sheet for a side margin portion may be punched in a state in which a carrier film is attached, such that the margin portions 114 and 115 may be disposed to surround the body 110 after performing the second side margin portion formation operation and performing a body formation operation and an external electrode formation operation. That is, the margin portions 114 and 115 may be disposed to extend to portions of the third and fourth surfaces 3 and 4 of the body 110 or may be disposed to cover an edge of the body 110. Accordingly, penetration of external moisture may be blocked to improve moisture-resistant reliability of the multilayer electronic component 100.

Similarly, in the operation of forming the first and second side margin portions, the ceramic green sheet for a side margin portion may be punched in a state in which a carrier film is attached, edges of the first and second side margin portions may form a curved surface. That is, there may be an advantage in that there is no need to additionally grind edges of the stacked chips 210 before sintering.

The method of manufacturing a multilayer electronic component according to an example embodiment may include a body formation operation of sintering the unit chip 210 having the first and second side margin portions 214 and 215 formed thereon after the second side margin portion formation operation. Sintering temperature is not particularly limited, but sintering may be performed at, for example, 1000 to 1300° C. In addition, sintering may be performed in a reducing atmosphere.

Thereafter, the multilayer electronic component 100 may be manufactured by forming external electrodes 131 and 132 on the third and fourth surfaces 3 and 4 of the body 110, respectively.

The unit chip 210 having the first and second side margin portions 214 and 215 formed thereon may be sintered to form the body 110 without an additional process, but the present disclosure is not limited thereto, and conductive paste including a metal having excellent electrical conductivity may be disposed on each of the third and fourth surfaces 3 and 4, and may be sintered simultaneously with the body 110 to form the external electrodes 131 and 132, thereby manufacturing the multilayer electronic component 100.

Figure 17:
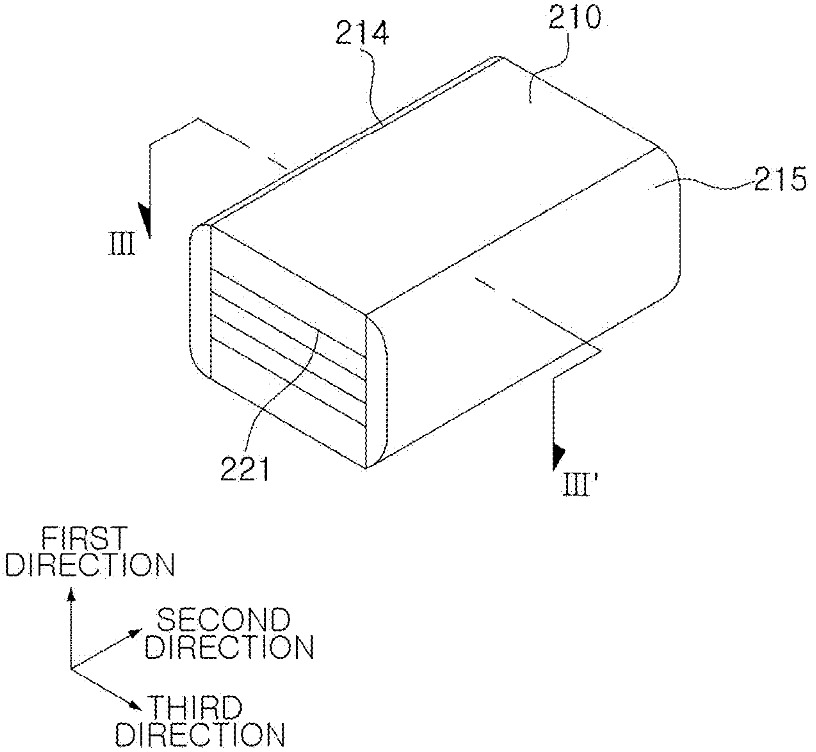
FIG. 17 is a schematic perspective view illustrating a state of a body before sintering is performed on a unit chip having first and second side margin portions formed thereon according to an example embodiment of the present disclosure.
Figure 18:
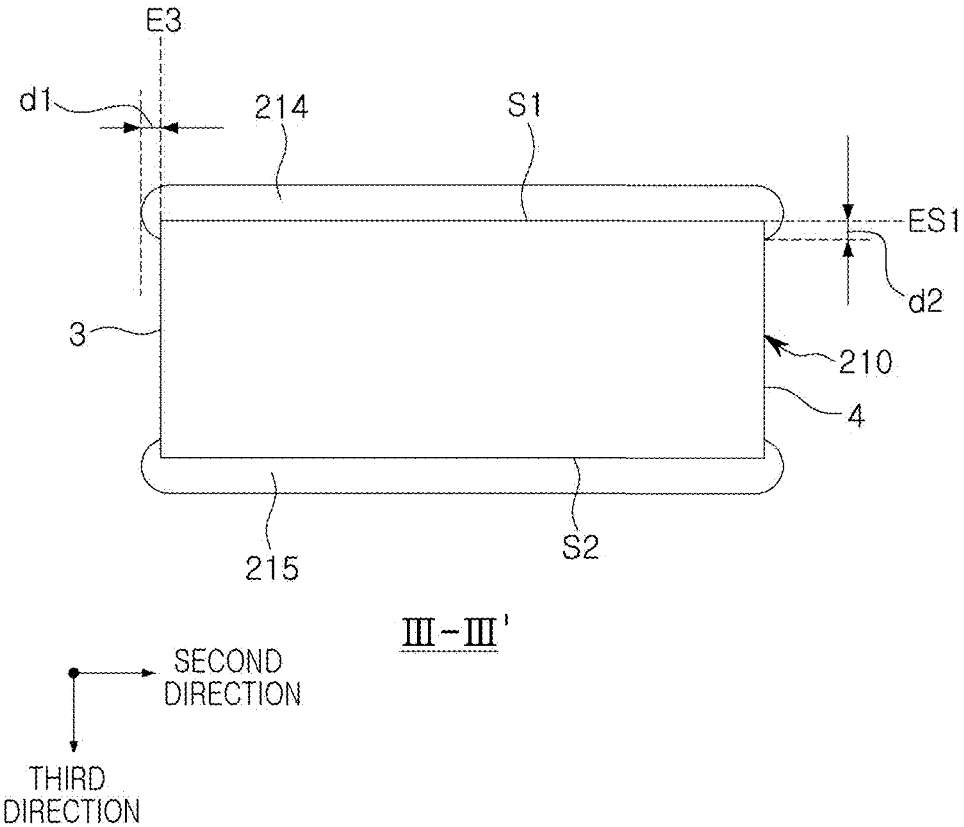
FIG. 18 is a cross-sectional view of FIG. 17 taken along line III-III'.

FIG. 18, a cross-sectional view of FIG. 17 taken along line III-III', schematically illustrates a cross-sectional view in a second direction and a third direction of the unit chip 210 to which the first and second side margin portions 214 and 215 are attached.

Figure 19:
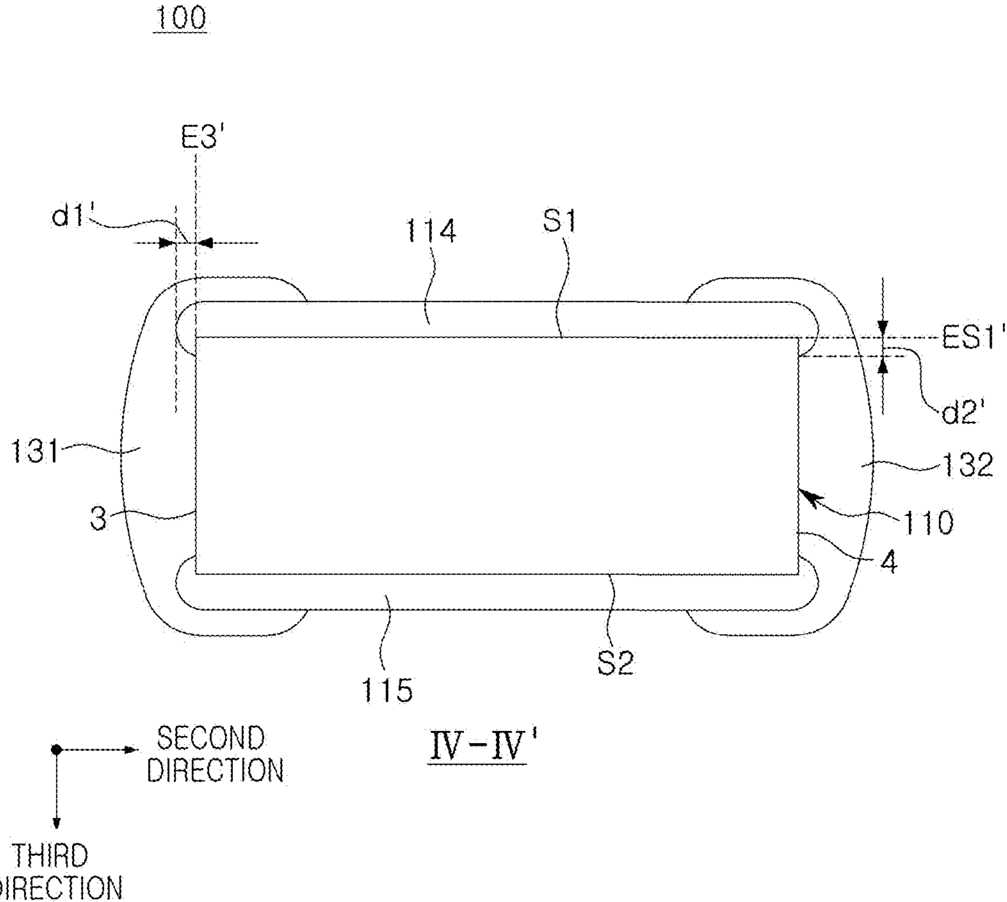
FIG. 19 is a cross-sectional view of FIG. 1 taken along line IV-IV'.

FIG. 19, a cross-sectional view of FIG. 1 taken along line IV-IV', schematically illustrates a cross-sectional view in a second direction and a third direction of the multilayer electronic component 100 according to an example embodiment of the present disclosure.

Referring to FIG. 18, first and second side margin portions may be disposed on the first side surface S1 and the second side surface S2 of the unit chip 210. In this case, the ceramic green sheet for a side margin portion 140 may be punched in a state of being disposed on the carrier film 350 described above, such that the first and second side margin portions 214 and 215 may be disposed to extend from the first and second side surfaces S1 and S2 of the unit chip 210 to a portion of at least one of the first to fourth surfaces 1, 2, 3, and 4.

In an example embodiment, when an average value of vertical distances between an extension line E3 of the third surface of the unit chip 210 and ends, adjacent to the third surface, among ends of the first and second side margin portions 214 and 215 in the second direction is defined as d1, and an average value of vertical distances between an extension line ES1 of the first side surface S1 of the unit chip 210 and ends of the first and second side margin portions 214 and 215 in contact with the third surface 3 or the fourth surface 4 is defined as d2, d1/d2 may satisfy greater than 0.4 and less than 0.8, Referring to FIG. 19, a first margin portion 114 may be disposed on the first side surface S1 of the body 110 of the multilayer electronic component 100, and a second margin portion 115 may be disposed on the second side surface S2. The first and second margin portions 114 and 115 may be formed by sintering the first and second side margin portions 214 and 215 of FIG. 18. The values of d1 and d2 of FIG. 18 may change as a sintering process for manufacturing the multilayer electronic component 100. That is, in an example embodiment, d1'/d2' may satisfy greater than 0.3 and less than 0.6, when an average value of vertical distances between an extension line E3' of a third surface of the body 110 and ends, adjacent to the third surface 3, among ends of the first and second margin portions 114 and 115 in the second direction is defined as d1', and an average value of vertical distances between an extension line ES1' of the first side surface S1 of the body 110 and ends of the first and second side margin portions 114 and 115 in contact with the third surface 3 or the fourth surface 4 is defined as d2'. When d1'/d2' satisfies greater than 0.3 and less than 0.6, the margin portions 114 and 115 may be disposed to sufficiently surround the body 110, such that penetration of external moisture may be blocked, thereby improving reliability of the multilayer electronic component 100.

d1, d2, d1', and d2' representing average values of vertical distances may be measured as follows.

d1 and d2 may correspond to values measured in the unit chip 210. Before sintering, a cross-section of the unit chip 210 in the second direction and the third direction may be polished such that an internal electrode pattern is not exposed, and the cross-section may be observed and measured with an optical microscopy (OM) or a scanning electron microscopy (SEM). In this case, the cross-section in the second direction and the third direction may be selected from ten cross-sections polished at equal intervals in a first direction of a cover portion, and the values may be further generalized by measuring average values of d1 and d2 measured in respective cross-sections.

d1' and d2' may correspond to values measured in the body 110. A cross-section of the multilayer electronic component 100 in the second direction and the third direction may be polished such that an internal electrode pattern is not exposed, and the cross-section may be observed and measured with an OM or an SEM. In this case, the cross-section in the second direction and the third direction may be selected from ten cross-sections polished at equal intervals in a first direction of a cover portion, and the values are further generalized by measuring average values of d1' and d2' measured in respective cross-sections.

FIG. 1 illustrates a schematic perspective view of a multilayer electronic component 100 manufacturable by a method of manufacturing a multilayer electronic component according to an example embodiment of the present disclosure.

Figure 2:
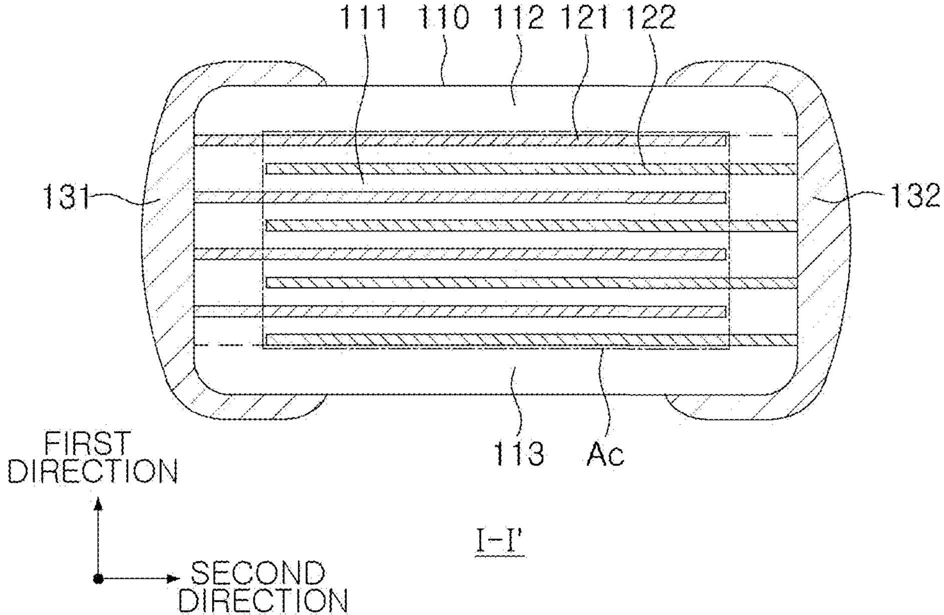
FIG. 2 is a cross-sectional view of FIG. 1 taken along line I-I'.

FIG. 2 is a cross-sectional view of FIG. 1 taken along line I-I'.

Figure 3:
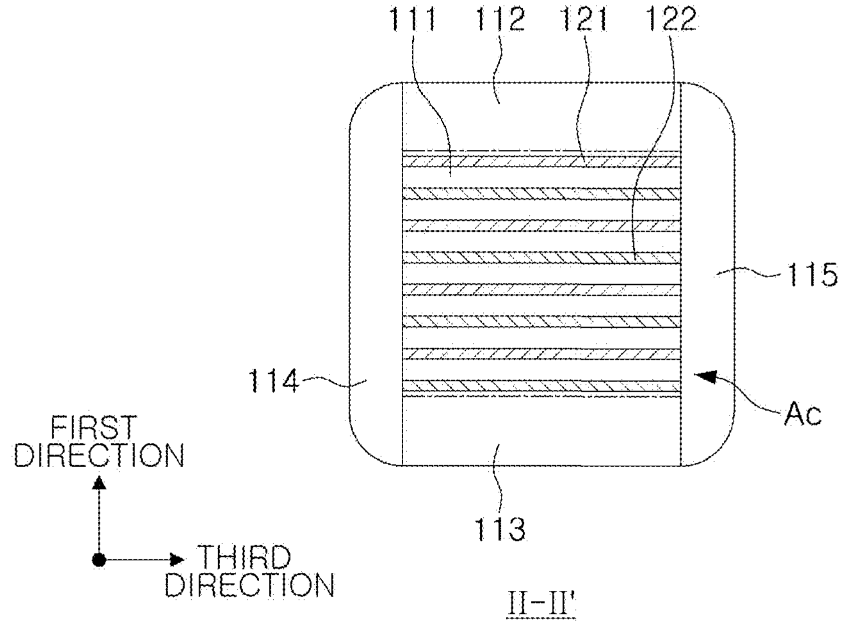
FIG. 3 is a cross-sectional view of FIG. 1 taken along line II-II'.

FIG. 3 is a cross-sectional view of FIG. 1 taken along line II-II'.

Hereinafter, with reference to FIGS. 1 to 3, the multilayer electronic component 100 manufacturable by a manufacturing method according to an example embodiment of the present disclosure will be described. However, the multilayer electronic component 100 is limited to have first to third forms, and the forms and number of an internal electrode and an external electrode may vary depending on a mounting position or a use thereof.

The multilayer electronic component 100 may include a body 110 including a dielectric layer 111 and first and second internal electrodes 121 and 122 alternately disposed with the dielectric layer interposed therebetween, and external electrodes 131 and 132 disposed on the body 110.

In the body 110, the dielectric layers 111 and the internal electrodes 121 and 122 may be alternately stacked.

A specific shape of the body 110 is not particularly limited. However, as illustrated, the body 110 may have a hexahedral shape or a shape similar thereto. During a sintering process, the ceramic powder included in the body 110 may be shrunken, such that the ceramic body 110 may have substantially hexahedral shape, not a hexahedral shape with entirely straight lines.

The body 110 may have first and second surfaces 1 and 2 opposing each other in a first direction, third and fourth surfaces connected to the first and second surfaces 1 and 2 and facing each other in a second direction, and first and second side surfaces S1 and S2 connected to the first to fourth surfaces and opposing each other in a third direction.

A plurality of dielectric layers 111 forming the body 110 may be in a sintered state, and the adjacent dielectric layers 111 may be integrated with each other such that boundaries therebetween are not readily apparent without using an SEM.

According to an example embodiment of the present disclosure, a raw material for forming the dielectric layer 111 is not particularly limited as long as sufficient capacitance is obtainable therewith. For example, a barium titanate-based material, a lead composite perovskite-based material, or a strontium titanate-based material may be used. The barium titanate-based material may include $BaTiO_3$-based ceramic powder. Examples of the ceramic powder may include $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), or $Ba(Ti_{1-y}Zr_y)O_3$ ($0<y<1$) obtained by partially dissolving Ca or Zr in $BaTiO_3$. When the plurality of ceramic green sheets 201 and 202 are sintered, the ceramic green sheets 201 and 202 may become the dielectric layer 111 included in the body 110.

In addition, as a material for forming the dielectric layer 111, various ceramic additives, organic solvents, binders, dispersants, and the like may be added to powder such as barium titanate ($BaTiO_3$) according to the purpose of the present disclosure.

The body 110 may include the capacitance formation portion Ac disposed within the body 110, including the first internal electrode 121 and the second internal electrode 122 opposing each other with the dielectric layer 111 interposed therebetween, and forming capacitance, and the cover portions 112 and 113 formed on upper and lower portions of the capacitance formation portion Ac.

In addition, the capacitance formation portion Ac, a portion contributing to capacitance formation of a capacitor, may be formed by repeatedly stacking a plurality of first and second internal electrodes 121 and 122 with a dielectric layer 111 interposed therebetween.

The cover portions 112 and 113 include an upper cover portion 112 disposed on an upper portion in the first direction of the capacitance formation portion Ac and a lower cover portion 113 disposed on a lower portion in the first direction of the capacitance formation portion Ac.

The upper cover portion 112 and the lower cover portion 113 may be formed by stacking a single dielectric layer or two or more dielectric layers on upper and lower surfaces of the capacitance formation portion Ac in a thickness direction, respectively, and may basically serve to prevent damage to an internal electrode caused by physical or chemical stress.

The upper cover portion 112 and the lower cover portion 113 may not include an internal electrode, and may include a material the same as that of the dielectric layer 111.

That is, the upper cover portion 112 and the lower cover portion 113 may include a ceramic material, for example, a barium titanate ($BaTiO_3$)-based ceramic material.

In addition, the margin portions 114 and 115 may be disposed on side surfaces of the capacitance formation portion Ac.

The margin portions 114 and 115 may include the margin portion 114 disposed on the first side surface S1 of the body 110 and the margin portion 115 disposed on the second side surface S2 of the body 110. That is, the margin portions 114 and 115 may be disposed on opposite end surfaces of the body 110 in the third direction.

As illustrated in FIG. 3, the margin portions 114 and 115 may refer to regions between opposite ends of the first and second internal electrodes 121 and 122 and boundaries of the body 110 in a cross-section of the body 110 cut in a width-thickness (W-T) direction.

The margin portions 114 and 115 may basically serve to prevent damage to an internal electrode due to physical or chemical stress.

According to an example embodiment of the present disclosure, in order to suppress a step difference caused by the internal electrodes 121 and 122, the internal electrodes 121 and 122 may be cut to be exposed to the first and second side surfaces S1 and S2 of the body 110 after being stacked, and then a single dielectric layer or two or more dielectric layers may be stacked on opposite side surfaces of the capacitance formation portion Ac in the third direction, thereby forming the margin portions 114 and 115.

A width of each of the margin portions 114 and 115 do not need to be particularly limited. However, an average thickness of the margin portions 114 and 115 may be 30 μm or less so as to more easily achieve miniaturization and implementation of high capacitance of a multilayer electronic component. In addition, according to an example embodiment of the present disclosure, the method of manufacturing a multilayer electronic component may include an arrangement operation of separating the unit chip from the support film in a direction in which the ceramic green sheets are stacked, and then moving and arranging the unit chip such that the second side surface of the unit chip is in contact with the adhesive tape, thereby manufacturing a multilayer electronic component having improved reliability. Thus, excellent reliability may be secured even when the average thickness of the margin portions 114 and 115 is 30 μm or less.

An average width of the marginal portions 114 and 115 may refer to an average size of the marginal portions 114 and 115 in the third direction, and may be an average value of sizes of the margin portions 114 and 115 in the third direction measured at five equally spaced points of a side surface of the capacitance formation portion Ac.

The plurality of internal electrodes 121 and 122 may be alternately disposed with the dielectric layer 111 interposed therebetween.

The plurality of internal electrodes 121 and 122 may include the first and second internal electrodes 121 and 122. The first and second internal electrodes 121 and 122 may be alternately disposed to oppose each other with the dielectric layer 111 included in the body 110 interposed therebetween, and may be respectively connected to the third and fourth surfaces 3 and 4 of the body 110.

Specifically, an end of the first internal electrode 121 may be connected to the third surface 3, and an end of the second internal electrode 122 may be connected to the fourth surface 4.

The first internal electrode 121 may be spaced apart from the fourth surface 4 and may be exposed through the third surface 3, and the second internal electrode 122 may be spaced apart from the third surface 3 and may be exposed through the fourth surface 4. A first external electrode 131 may be disposed on the third surface 3 of the body and may be connected to the first internal electrode 121, and a second external electrode 132 may be disposed on the fourth surface 4 of the body and may be connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 131. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically isolated from each other by the dielectric layer 111 disposed therebetween.

The body 110 may be formed by alternately stacking the ceramic green sheets 201 on which the first internal electrode patterns 221 are printed and the ceramic green sheets 202 on which the second internal electrode patterns 222 are printed, and then performing sintering thereon.

A material for forming the internal electrodes 121 and 122 is not particularly limited, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing conductive paste for an internal electrode including one or more of nickel (Ni), copper (Cu), palladium (Pd), silver (Ag), gold (Au), platinum (Pt), tin (Sn), tungsten (W), titanium (Ti), and alloys thereof on a ceramic green sheet. A screen-printing method or a gravure printing method may be used as a method of printing the conductive paste for an internal electrode, but the present disclosure is not limited thereto.

The external electrodes 131 and 132 may be disposed on the third and fourth surfaces 3 and 4 of the body 110, respectively, such that the first external electrode 131 may be electrically connected to the first internal electrode 121 and the second external electrode 132 may be electrically connected to the second internal electrode 122.

In the present example embodiment, a structure in which the multilayer electronic component 100 has two external electrodes 131 and 132 is described, but the number and shapes of the external electrodes 131 and 132 may be changed depending on shapes of the internal electrodes 121 and 122 and other purposes.

The external electrodes 131 and 132 may be formed of any material having electrical conductivity, such as a metal, may be determined to include a specific material in consideration of electrical properties and structural stability, and may further have a multilayer structure.

For example, the external electrodes 131 and 132 may include an electrode layer disposed on a surface of the body 110 to be in contact with the internal electrodes 121 and 122, and a plating layer formed on the electrode layer.

As a more specific example of the electrode layer, the electrode layer may be a sintered electrode including a conductive metal and glass, or a resin-based electrode including a conductive metal and a resin.

In addition, the electrode layer may have a form in which the sintered electrode and the resin-based electrode are sequentially formed on a body. In addition, the electrode layer may be formed by transferring a sheet including a conductive metal onto the body or by transferring a sheet including a conductive metal onto the sintered electrode.

A material having excellent electrical conductivity may be used as the conductive metal included in the electrode layer, and is not particularly limited. For example, the conductive metal may be one or more of nickel (Ni), copper (Cu), and an alloy thereof.

The plating layer may serve to improve mounting properties. A type of the plating layer is not particularly limited, and may be a plating layer including one or more of Ni, Sn, Pd, and alloys thereof, and may be formed of a plurality of layers.

As a more specific example of the plating layer, the plating layer may be a Ni plating layer or a Sn plating layer, may have a form in which a Ni plating layer and a Sn plating layer are sequentially formed on the electrode layer, or may have a form which a Sn plating layer, a Ni plating layer, and a Sn plating layer are sequentially formed on the electrode layer. In addition, the plating layer may include a plurality of Ni plating layers and/or a plurality of Sn plating layers.

EXAMPLE

A stack was manufactured on a support film using a dielectric ceramic green sheet formed of $BaTiO_3$ powder and sub-ingredients and a conductive pattern formed of Ni powder. A direction in which a plurality of ceramic green sheets are stacked based on the stack is defined as a first direction. Thereafter, the stack was cut in a second direction, perpendicular to the first direction, and was cut in a third direction, perpendicular to the second direction, to form a plurality of unit chips. During such a cutting process, the stack was cut such that a unit chip includes a first internal electrode pattern in which a cut surface of a conductive pattern is exposed to a surface of the unit chip in the second direction, and first and second side surfaces, and a second internal electrode pattern in which the cut surface of the conductive pattern is exposed to the other surface of the unit chip in the second direction, and the first and second side surfaces.

Thereafter, the unit chip was separated from a support film, and then may be arranged such that a second side surface of the chip is in contact with adhesive tape.

Thereafter, the first side surface was attached to a ceramic green sheet for a side margin portion formed of $BaTiO_3$ powder and sub-ingredients to form a first side margin portion, and a second side margin portion was formed in the same manner.

Thereafter, the unit chip having the first and second side margins formed thereon was sintered at a sintering temperature of 1300° C. or lower and a hydrogen concentration of 2.0% $H_2$ or less to form a body, and conductive paste may be applied onto the body to form an external electrode.

Accordingly, a sample of a multilayer electronic component according to the Example was formed.

Comparative Example

A stack was manufactured on a support film using a dielectric ceramic green sheet formed of $BaTiO_3$ powder and sub-ingredients and a conductive pattern formed of Ni powder. A direction in which a plurality of ceramic green sheets are stacked based on the stack is defined as a first direction. Thereafter, the stack was cut in a second direction, perpendicular to the first direction, and was cut in a third direction, perpendicular to the second direction, to form a plurality of unit chips. During such a cutting process, the stack was cut such that a unit chip includes a first internal electrode pattern in which a cut surface of a conductive pattern is exposed to a surface of the unit chip in the second direction, and first and second side surfaces, and a second internal electrode pattern in which the cut surface of the conductive pattern is exposed to the other surface of the unit chip in the second direction, and the first and second side surfaces.

Thereafter, as disclosed in Related Art 1, a tumbling process of rotating the plurality of unit chips by 90 degrees at once by disposing a tumbling action plate on an upper surface of the unit chip and moving the support film and the tumbling action plate to be in parallel with each other in an opposite direction.

Thereafter, the first side surface was attached to a ceramic green sheet for a side margin portion formed of $BaTiO_3$ powder and sub-ingredients to form a first side margin portion, and a second side margin portion was formed in the same manner.

Thereafter, the unit chip having the first and second side margin portions formed thereon was sintered at a sintering temperature of 1300° C. or lower and a hydrogen concentration of 2.0% H2 or less to form a body, and conductive paste may be applied onto the body to form an external electrode. Accordingly, a sample of a multilayer electronic component according to the Comparative Example was formed.

Table 1 below was prepared by evaluating whether cracks occur at a boundary between a capacitance formation portion and a cover portion with respect to the multilayer electronic component manufactured according to the Example and the multilayer electronic component manufactured according to the Comparative Example.

A group of unit chips manufactured by performing a method of manufacturing a multilayer electronic component once is defined as 1 Lot. In Table 1 below, about 1,000,000 or more unit chips were manufactured per 1 Lot.

In Table 1 below, 50 samples of each of the multilayer electronic components manufactured according to the Example and the Comparative Example were randomly collected for each 1 Lot.

Thereafter, the collected samples were molded, and then polished up to a central point in the third direction of a surface in the first and second directions and a central point in the second direction of a surface in the first and third direction, and then polished to the center point in the first and second directions. Thereafter, the boundary between the cover portion and the capacitance forming portion on the surface in the first and second directions and the surface in the first and third directions was observed with an OM at a magnification of 25 to 100 times. A case in which cracking was observed was determined to be defective.

TABLE 1

| | Comparative Example | Example |
|---|---|---|
| Crack Occurrence Rate (PPM) | 2000 | 370 |
| Lot Number | 20 | 27 |

Referring to Table 1, it can be seen that the multilayer electronic component according to the Comparative Example including the tumbling process according to Related Art 1 had a crack occurrence rate of 2000 PPM in total 20 Lot.

In addition, it can be seen that the multilayer electronic component according to the Example including the arrangement operation P3 according to an example embodiment of the present disclosure instead of the tumbling process according to Related Art 1 had a crack occurrence rate of only 370 PPM in total 27 Lot.

Accordingly, according to Table 1, Example including the arrangement operation P3 according to an example embodiment of the present disclosure instead of the tumbling process according to Related Art 1 may suppress cracks occurring at the boundary between the capacitance formation portion and the cover portion of the completed multilayer electronic component by suppressing damage occurring to an edge of the unit chip by the tumbling process according to Related Art 1, thereby improving reliability of the multilayer electronic component.

Table 2 below shows composite reliability evaluation results of the multilayer electronic component manufactured according to the Example and the multilayer electronic component manufactured according to the Comparative Example.

In Table 2, 20 samples of each of the multilayer electronic components manufactured according to the Example and Comparative Example were randomly extracted. A composite reliability test was conducted by maintaining 20 samples at 40° C. and 4.8 V for one hour (Section 1), maintaining 20 samples at 85° C. and 4.8 V for one hour (Section 2), and then maintaining 20 samples at 85° C., 2.8 V, and a relative humidity of 65% for two hours (Section 3). With respect to each section, samples in which an insulation resistance (IR) value of the multilayer electronic component falls below 1.0E^+05 were evaluated as defective products, and the others were evaluated as normal products. In the composite reliability test, Sections 1 to 3 may be continuously performed.

TABLE 2

| | Defect Rate After Section 1 to Section 3 (The Number of Defective Products/The Number of Samples) |
|---|---|
| Comparative Example | 2/20 |
| Example | 0/20 |

Referring to Table 2, in the multilayer electronic component manufactured by the Comparative Example, two defective products having an IR value falling below 1.0E^+05 of an initial value occurred after Sections 1 to 3. In the multilayer electronic component manufactured according to the Example, it can be seen that there was no sample having an IR value falls below 1.0E^+05 of an initial value after Section 1 to 3. In addition, in the multilayer electronic component manufactured according to the Example, there was no sample having an initial value decreased by more than 1.0E^+02 order in Section 1.

Accordingly, according to Table 2, Example including the arrangement operation P3 according to an example embodiment of the present disclosure instead of the tumbling process according to Related Art 1 may prevent a decrease in IR of a multilayer electronic component in a high-temperature and high-humidity environment by suppressing the concentration of stress on the edge of the unit chip, thereby improving reliability of the multilayer electronic component.

While example embodiments have been shown and described above, it will be apparent to those skilled in the art that modifications and variations could be made without departing from the scope of the present invention as defined by the appended claims.

In addition, the term "an example embodiment" does not refer to the same example embodiment, and describe different unique features of various example embodiments. However, the above-suggested example embodiments may also be implemented to be combined with a feature of another example embodiment. For example, even when a content described with respect to an example embodiment is not described in another example embodiment, it may be understood as a description related to the other example embodiment unless described to the contrary or contradictory in the other example embodiment.

In addition, the term "an example embodiment" does not refer to the same example embodiment, and describe different unique features of various example embodiments. However, the above-suggested example embodiments may also be implemented to be combined with a feature of another example embodiment. For example, even when a content described with respect to an example embodiment is not described in another example embodiment, it may be understood as a description related to the other example embodiment unless described to the contrary or contradictory in the other example embodiment.

What is claimed is:

1. A method of manufacturing a multilayer electronic component, the method comprising:

a stack forming operation of forming a stack, by stacking a plurality of ceramic green sheets on which conductive patterns are disposed, on a support film, a direction in which the plurality of ceramic green sheets are stacked relative to the stack being a first direction;

a stack cutting operation of cutting the stack in a second direction, perpendicular to the first direction, and cutting the stack in a third direction, perpendicular to the first and second directions, to obtain a plurality of unit chips such that one of the plurality of unit chips includes a first internal electrode pattern in which a cut surface of the conductive pattern is exposed to one surface of the one unit chip in the second direction and first and second side surfaces opposing each other in the third direction, and a second internal electrode pattern in which the cut surface of the conductive pattern is exposed to the other surface of the one unit chip in the second direction and the first and second side surfaces;

an arrangement operation of separating the one unit chip from the support film, and then arranging the one unit chip such that the second side surface of the one unit chip is in contact with an adhesive tape; and a first side margin portion formation operation of attaching the first side surface directly to a ceramic green sheet for a side margin portion, and forming a first side margin portion on the first side surface of the one unit chip.

2. The method of claim 1, wherein the arrangement operation is performed by separating the one unit chip from the support film in the first direction, and then arranging the one unit chip such that the second side surface of the one unit chip is in contact with the adhesive tape moving to be parallel to the first and second side surfaces of the one unit chip and disposed to be close to the second side surface among the first and second side surfaces.

3. The method of claim 1, wherein the separation is performed such that the one unit chip is completely separated from the support film.

4. The method of claim 1, further comprising:

a support film rotation operation of rotating the support film between the stack cutting operation and the arrangement operation.

5. The method of claim 4, wherein the stack forming operation and the stack cutting operation are performed in a state in which the support film is disposed to be substantially parallel to a floor, and the support film is disposed to be substantially perpendicular to the floor by the support film rotation operation to perform the arrangement operation.

6. The method of claim 4, wherein a separation distance between each of the plurality of unit chips immediately after the stack cutting operation is performed is substantially the same during the support film rotation operation.

7. The method of claim 1, wherein the stack forming operation and the stack cutting operation are performed in a state in which the support film is disposed to be substantially perpendicular to a floor, and the adhesive tape is disposed to be substantially horizontal to the floor to perform the arrangement operation.

8. The method of claim 1, further comprising:

a support film rotation operation of rotating the support film between the stack forming operation and the stack cutting operation.

9. The method of claim 1, wherein the arrangement operation is performed by separating unit chips disposed in even columns of the same row and unit chips disposed in odd columns of the same row, and disposing the separated unit chips on the adhesive tape.

10. The method of claim 1, wherein the arrangement operation is performed by simultaneously separating unit chips disposed in a row, and disposing the separated unit chips on the adhesive tape.

11. The method of claim 10, wherein the arrangement operation is performed by pulling the adhesive tape, on which the unit chips disposed in the row are disposed, in a column direction such that the unit chips disposed in the row are spaced from each other.

12. The method of claim 1, wherein the first side margin portion formation operation is performed by punching the ceramic green sheet for a side margin portion to which the first side surface is attached.

13. The method of claim 12, wherein the attachment and the punching are performed in a state in which the ceramic green sheet for a side margin portion is disposed on a carrier film.

14. The method of claim 13, wherein a thickness of the carrier film is 10 μm or more and 30 μm or less.

15. The method of claim 13, wherein the carrier film is disposed on an elastic pad.

16. The method of claim 13, wherein an adhesive ingredient is not coated on a surface of the ceramic green sheet for a side margin portion in contact with the first side surface.

17. The method of claim 1, further comprising:

a second side margin portion formation operation of attaching the second side surface to another ceramic green sheet for a side margin portion, and forming a second side margin portion on the second side surface of the one unit chip;

a body formation operation of forming a body by sintering the one unit chip having the first and second side margin portions formed thereon; and an external electrode formation operation of forming an external electrode on the body.

18. The method of claim 17, wherein, in the first side margin portion formation operation and the second side margin portion formation operation, the attachment and the punching are performed in a state in which each of the ceramic green sheet for a side margin portion and the another of the ceramic green sheet for a side margin portion is disposed on a carrier film.

19. The method of claim 18, wherein one surface of the one unit chip in the second direction is defined as a third surface and the other surface of the one unit chip in the second direction is defined as a fourth surface, and d1/d2 satisfies greater than 0.4 and less than 0.8, in which dl is an average value of vertical distances between an extension line of the third surface of the one unit chip and ends, adjacent to the third surface, among ends of the first and second side margin portions in the second direction, and d2 is an average value of vertical distances between an extension line of the first side surface of the one unit chip and ends of the first and second side margin portions in contact with the third surface or the fourth surface.

20. The method of claim 18, wherein one surface of the one unit chip in the second direction is defined as a third surface and the other surface of the one unit chip in the second direction is defined as a fourth surface, the first and second side margin portions are sintered to form first and second margin portions, and d1'/d2' satisfies greater than 0.3 and less than 0.6, in which d1' is an average value of vertical distances between an extension line of a third surface of the body corresponding to the third surface of the one unit chip and ends, adjacent to the third surface of the body, among ends of the first and second margin portions in the second direction, and d2' is an average value of vertical distances between an extension line of the first side surface of the body and ends of the first and second side margin portions in contact with the third surface of the body or a fourth surface of the body corresponding to the fourth surface of the one unit chip.

21. The method of claim 17, wherein the first and second side margin portions are sintered to form first and second margin portions, and the first and second margin portions are disposed to surround the body.

22. The method of claim 17, wherein the first and second side margin portions are sintered to form first and second margin portions, and edges of the first and second margin portions form a curved surface.

23. The method of claim 17, wherein the first and second side margin portions are sintered to form first and second margin portions, and the first and second margin portions are disposed to cover an edge of the body.

24. The method of claim 17, wherein the first and second side margin portions are sintered to form first and second margin portions, and an average thickness of the first and second margin portions is 30 μm or less.

25. A method of manufacturing a multilayer electronic component, the method comprising:

a stack forming operation of forming a stack, by stacking a plurality of ceramic green sheets on which conductive patterns are disposed, on a support film, a direction in which the plurality of ceramic green sheets are stacked relative to the stack being a first direction;

a stack cutting operation of cutting the stack in a second direction, perpendicular to the first direction, and cutting the stack in a third direction, perpendicular to the first and second directions, to obtain a plurality of unit chips such that one of the plurality of unit chips includes a first internal electrode pattern in which a cut surface of the conductive pattern is exposed to one surface of the one unit chip in the second direction and first and second side surfaces opposing each other in the third direction, and a second internal electrode pattern in which the cut surface of the conductive pattern is exposed to the other surface of the one unit chip in the second direction and the first and second side surfaces;

an arrangement operation of separating the one unit chip from the support film without rotating the one unit chip with respect to the support film, and arranging the one unit chip such that the second side surface of the one unit chip is in contact with an adhesive tape; and a first side margin portion formation operation of attaching the first side surface directly to a ceramic green sheet for a side margin portion, and forming a first side margin portion on the first side surface of the one unit chip.

26. The method of claim 25, wherein the arrangement is performed such that the second side surface is in contact with the adhesive tape without rotating the separated one unit chip with respect to the support film.

27. The method of claim 25, wherein the separation is performed such that the one unit chip is completely separated from the support film.

28. The method of claim 25, further comprising:

a support film rotation operation of rotating the support film between the stack cutting operation and the arrangement operation.

29. The method of claim 28, wherein the stack forming operation and the stack cutting operation are performed in a state in which the support film is disposed to be substantially parallel to a floor, and the support film is disposed to be substantially perpendicular to the floor by the support film rotation operation to perform the arrangement operation.

30. The method of claim 28, wherein a separation distance between each of the plurality of unit chips immediately after the stack cutting operation is performed is substantially the same during the support film rotation operation.

31. The method of claim 25, wherein the stack forming operation and the stack cutting operation are performed in a state in which the support film is disposed to be substantially perpendicular to a floor, and the adhesive tape is disposed to be substantially horizontal to the floor to perform the arrangement operation.

32. The method of claim 25, further comprising:

a support film rotation operation of rotating the support film between the stack forming operation and the stack cutting operation.

33. The method of claim 25, wherein the arrangement operation is performed by separating unit chips disposed in even columns of the same row and unit chips disposed in odd columns of the same row, and disposing the separated unit chips on the adhesive tape.

34. The method of claim 25, wherein the arrangement operation is performed by simultaneously separating unit chips disposed in a row, and disposing the separated unit chips on the adhesive tape.

35. The method of claim 34, wherein the arrangement operation is performed by pulling the adhesive tape, on which the unit chips disposed in the row are disposed, in a column direction such that the unit chips disposed in the row are spaced from each other.

36. The method of claim 25, wherein the first side margin portion formation operation is performed by punching the ceramic green sheet for a side margin portion to which the first side surface is attached.

37. The method of claim 36, wherein the attachment and the punching are performed in a state in which the ceramic green sheet for a side margin portion is disposed on a carrier film.

38. The method of claim 36, wherein an adhesive ingredient is not coated on a surface of the ceramic green sheet for a side margin portion in contact with the first side surface.

39. The method of claim 25, further comprising:

a second side margin portion formation operation of forming a second side margin portion by attaching the second side surface to another ceramic green sheet for a side margin portion and punching the ceramic green sheet for a side margin portion on the second side surface of the one unit chip;

a body formation operation of forming a body by sintering the one unit chip having the first and second side margin portions formed thereon; and an external electrode formation operation of forming an external electrode on the body.

40. The method of claim 39, wherein, in the first side margin portion formation operation and the second side margin portion formation operation, the attachment and the punching are performed in a state in which each of the ceramic green sheet for a side margin portion and the another of the ceramic green sheet for a side margin portion is disposed on a carrier film.

41. A method of manufacturing a multilayer electronic component, the method comprising:

forming a stack, by stacking a plurality of ceramic green sheets on which conductive patterns are disposed, on a support film;

cutting the stack on the support film to form an array of unit chips;

transferring the array of unit chips from the support film to an adhesive tape such that a cut surface among a plurality of surfaces of each unit chip becomes a temporary mounting surface being mounted on and in contact with the adhesive tape; and attaching a ceramic green sheet for a side margin portion directly on a surface of each unit chip opposing the temporary mounting surface thereof to form a first side margin portion on each unit chip, wherein the transferring is performed in a state in which the cut surface among the plurality of surfaces of a respective one of the unit chips which is disposed on the support film and which is to be transferred faces a plane of the adhesive tape.

42. The method of claim 41, wherein in the transferring, the adhesive tape is disposed substantially horizontal to the ground.

43. The method of claim 41, further comprising:

after forming the first side margin portion on each unit chip, transferring the unit chips from the adhesive tape to another adhesive tape such that the first side margin portion of each unit chip is in contact with the another adhesive tape; and attaching another ceramic green sheet for a side margin portion on the temporary mounting surface of each unit chip to form a second side margin portion on each unit chip.

44. The method of claim 43, further comprising:

after forming the first and second side margin portions, sintering the unit chips with the first and second side margin portions.

45. The method of claim 44, further comprising:

after sintering, forming external electrodes on each sintered unit chip.

46. The method of claim 44, wherein after forming the first and second side margin portions and before sintering, no grinding or polishing is performed to each unit chip.

47. The method of claim 41, wherein the attaching the ceramic green sheet for a side margin portion is performed by punching the ceramic green sheet for a side margin portion against the adhesive tape on which the transferred unit chips are disposed.

* * * * *